US011481412B2

(12) United States Patent
Swamy et al.

(10) Patent No.: US 11,481,412 B2
(45) Date of Patent: Oct. 25, 2022

(54) DATA INTEGRATION AND CURATION

(71) Applicant: ACCENTURE GLOBAL SOLUTIONS LIMITED, Dublin (IE)

(72) Inventors: Jayant Swamy, Bangalore (IN); Aniruddha Ray, Bangalore (IN); Namratha Maheshwary, Bangalore (IN); Swanidhi Singh, Ghaziabad (IN); Ruchi Soni, New Delhi (IN); Pramukh Nanjundaswamy Vasist, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 329 days.

(21) Appl. No.: 16/936,125

(22) Filed: Jul. 22, 2020

(65) Prior Publication Data

US 2021/0191957 A1    Jun. 24, 2021

(30) Foreign Application Priority Data

Dec. 3, 2019    (IN) .............................. 201911049712

(51) Int. Cl.
| A61N 1/00 | (2006.01) |
| G06F 16/28 | (2019.01) |
| G06F 16/25 | (2019.01) |
| G06N 5/02 | (2006.01) |
| G06F 16/2457 | (2019.01) |
| G06K 9/62 | (2022.01) |
| G06F 16/215 | (2019.01) |

(52) U.S. Cl.
CPC .......... *G06F 16/285* (2019.01); *G06F 16/215* (2019.01); *G06F 16/24573* (2019.01); *G06F 16/254* (2019.01); *G06K 9/6256* (2013.01); *G06N 5/025* (2013.01)

(58) Field of Classification Search
CPC ............. G06F 16/285; G06F 16/24573; G06F 16/215; G06F 16/254; G06K 9/6256; G06N 5/025
USPC .................................................. 707/600–899
See application file for complete search history.

(56) References Cited

U.S. PATENT DOCUMENTS

| 9,965,531 B2 | 5/2018 | O+3 Kane et al. |
| 2018/0181641 A1 | 6/2018 | Das et al. |
| 2019/0258648 A1 | 8/2019 | Bhide et al. |

*Primary Examiner* — Isaac M Woo
(74) *Attorney, Agent, or Firm* — Mannava & Kang, P.C.

(57) ABSTRACT

Examples of a data integration and curation system are provided. The system may receive data extracting requirement related to a digital initiative and obtain digital initiative data associated with the same. The system may classify the digital initiative data into various data domains and extract metadata therefrom based on data analysis. The system may determine a word index including a plurality of words from a knowledge database. The plurality of words may be mapped with the data domains to identify a data anomaly in the digital initiative data. The system may determine an anomaly correction for resolving the data anomaly and update the plurality of data domains to include the anomaly correction. The system may identify a user parameter associated with the digital initiative. The system may associate the user parameter with the metadata to create user parameter data associated with the user parameter to generate a data extraction result.

20 Claims, 20 Drawing Sheets

1800

Receiving a data extracting requirement from a user, wherein the data extracting requirement is associated with a digital initiative 1802

Obtaining digital initiative data associated with the digital initiative from a data source 1804

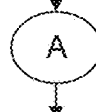

Determining a word index from a knowledge database, the word index including a plurality of words being associated with the digital initiative data 1814

Mapping the plurality of words with the plurality of data domains to identify a data anomaly in the digital initiative data 1816

Determining an anomaly correction to the digital initiative data for resolving the data anomaly based on the word index 1818

Updating the plurality of data domains to include the anomaly correction for the data anomaly 1820

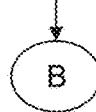

*FIG. 18A*

DATA INTEGRATION AND CURATION

PRIORITY CLAIM

This application claims priority to Indian provisional patent application number 201911049712, filed on Dec. 3, 2019, the disclosure of which is incorporated by reference in its entirety.

BACKGROUND

The importance of enterprise data management has increased significantly in recent times. Specifically, there is a need for enterprise data management in complex data environments such as a cloud platform with multiple data lakes, and different deployment patterns. For example, complex data environments may require a well-defined data management approach for effective data classification, data storage, and data retrieval. Also, as data for organizations has increased in terms of size, and complexity, the organizations are increasingly migrating on-premise data onto multiple data platforms, and repositories for catering to multiple data processing requirements. Additionally, the data may be spread across the organization's disparate sources, such as different operations, and units. Each of these sources may maintain its own set of tools for discovery, curation, cataloging, governance, and data sharing. In some instances, different operations, and units may maintain the same data, and modify the same according to their objectives. This may lead to data duplication and investment of resources for storing the same data at different platforms.

Currently, there is no unified data management approach where all users can access a common data platform for discovering enterprise-scale data, understand, and the data's DNA, which may include risk, quality, relevance, and lineage; and promote cross-functional data sharing. There may be many factors influencing such a lack of integration for a unified view. These may include, for example, requirements for adhering to regulatory changes, governing data centrally, maintaining data accuracy, checking data quality, and securely sharing data. Often, the disparate data landscape created due to multiple data platforms leads to multiple interpretations of the same data, thereby leading to poor data veracity. Additionally, different operations and units may require the same data processed, and sanitized differently, thereby further adding a complexity layer to the unified data management approach.

Therefore, to ensure effectiveness, efficiency, and completeness, both qualitatively, and quantitatively, there is a requirement to create a unified approach for data governance for optimally utilizing multiple data platforms and repositories. Such an approach may also be required for creating effective data sharing mechanisms across multiple data platforms and repositories in a secured manner. Furthermore, there is a need to efficiently analyze data and provide a centralized data hub for enterprise data analysis.

Accordingly, a technical problem with the currently available systems for data integration and curation is that they may be inefficient, inaccurate, and/or not scalable for various operations within an organization. There is a need for integrated data governance that may account for the various factors mentioned above, amongst others, for creating, storing, validating, updating, and retrieving enterprise data for different operations, and from different platforms efficiently.

BRIEF DESCRIPTION OF DRAWINGS

FIGS. 18A, 18B, and 18C illustrate a process flowchart for data integration and curation, according to an example embodiment of the present disclosure.

DETAILED DESCRIPTION

Figure 1:
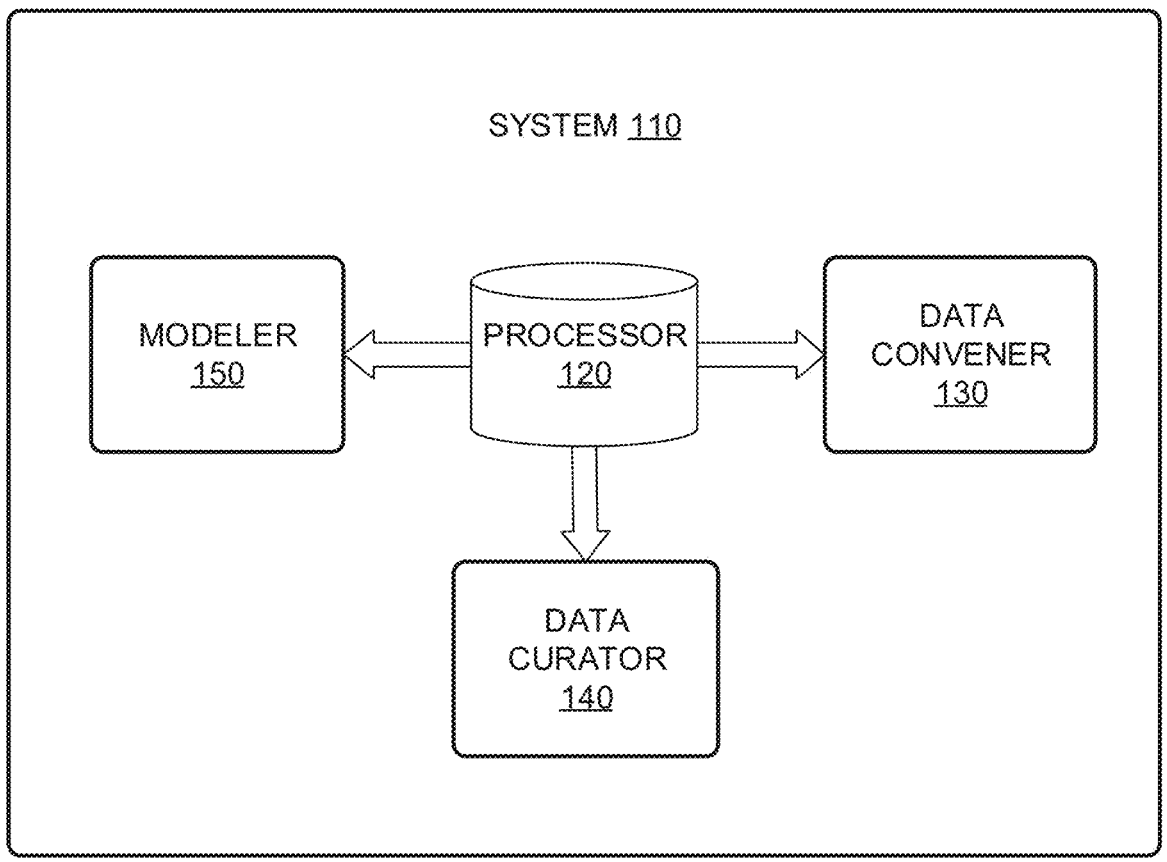
FIG. 1 illustrates a data integration and curation system, according to an example embodiment of the present disclosure.

For simplicity, and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a", and "an" are intended to denote at least one of a particular element. The terms "a", and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes systems, and methods for data integration and curation using Artificial Intelligence (AI), and Machine Learning (ML) based data curation, data cataloging, and data personalization. A Data Integration and Curation System (DICS) hereinafter referred to as a "system" may be used to create a unified view for all data types in the organization. The system may provide for a centralized data hub on a cloud platform. The centralized data hub may provide enterprise data analysis for validation data veracity and smart data consumption. For example, the centralized hub may identify attributes such as a data context, data interrelationships, a data provenance, an audit trail, and the like to ensure data quality. The smart data consumption may enable the consumption of data in diverse formats and consumption patterns. The system may facilitate data integration and curation in complex data environments such as cloud platforms with multiple data lakes, and different deployment patterns, and no well-defined data management approach. The system may present a unified solution/platform which may connect to various cloud platforms, data lakes, and other data sources to fulfill data discovery, cataloging, governance, curation, and data sharing needs within an enterprise. Further, the system may provide a user with access to data based on the role of the user with respect to an operation or a unit within an organization.

The system may include a processor, a data convener, a data curator, and a modeler. The processor may be coupled to the data convener, the data curator, and the modeler. The data convener may receive a data extracting requirement from a user. The data extracting requirement may be associated with a digital initiative. The data convener may obtain digital initiative data associated with the digital initiative from a data source. The data convener may extract metadata from the obtained digital initiative data based on data analysis. The data analysis may be performed by implementing an artificial intelligence component. The data convener may classify the digital initiative data into a plurality of data domains. Each of the plurality of data domains may be pertaining to an attribute associated with the digital initiative. The data convener may evaluate the plurality of data domains to identify a data usage pattern model associated with the digital initiative. The data convener may identify a data relationship between each of the plurality of data domains based on a training dataset, the training dataset derived using a rule database, and a recommendation database to extract the metadata.

The data curator may determine a word index from a knowledge database. The word index may include a plurality of words associated with the digital initiative data. The data curator may map the plurality of words with the plurality of data domains to identify a data anomaly in the digital initiative data. The data curator may determine an anomaly correction to the digital initiative data for resolving the data anomaly based on the word index. The data curator may update the plurality of data domains to include the anomaly correction for the data anomaly.

The modeler may identify a user parameter associated with the digital initiative based on the rule database, and the recommendation database. The user parameter may be an identifier associated with the user. The modeler may associate the user parameter with the metadata to identify the data usage pattern model associated with the user parameter. The modeler may retrieve the updated plurality of data domains within the data usage pattern model associated with the user parameter to create user parameter data associated with the user parameter. The modeler may generate a data extraction result comprising the user parameter data associated with implementing the digital initiative. The modeler may implement a data extraction action based on the data extraction result, the data extraction including retrieving the user parameter data associated with the digital initiative accessible to the user associated with the user parameter.

Accordingly, the present disclosure aims to provide a data integration and curation system that may account for the various factors mentioned above in an efficient, and cost-effective manner. Further, the system may leverage machine learning to increase cross-functional data usage, reduce manual data handling, and provide for faster adoption of regulatory changes. The system may reduce costs through the identification of value-adding data items. The system may protect from fraudulent data access by various users. The system may seamlessly integrate with existing tools for data management such as tools for data cataloging, data quality management, data curation, data governance, data self-service, and the like.

The embodiments for the data integration and curation requirement presented herein are exemplary in nature and should be treated as such. For the sake of brevity, and technical clarity, the description of the data integration and curation system may be restricted to a few exemplary embodiments; however, to a person of ordinary skill in the art, it should be clear that the system may be used for the fulfillment of various data integration and curation requirements other than those mentioned hereinafter.

FIG. 1 illustrates a system for data integration and curation system 110 (referred to as system 110 hereinafter), according to an example implementation of the present disclosure. In an example, the system 110 may include a processor 120. The processor 120 may be coupled to a data convener 130, a data curator 140, and a modeler 150.

The data convener 130 may receive a data extracting requirement from a user. The data extracting requirement may be associated with a digital initiative. The digital initiative may be a digitally implemented operation in an organization. The digital initiative may be associated with any process within the organization. The data extracting requirement may refer to the extraction of data from across various data platforms for implementing the digital initiative. Further, the data extracting requirement may refer to providing data access for implementing the digital initiative in a role-based manner. For example, a data custodian, a data steward, and a data consumer may be provided with access to data based on their requirement, and role in implementing the digital initiative. The data convener 130 may obtain digital initiative data associated with the digital initiative from a data source (For sake of technical clarity, the terms "data source", and "data sources" have been used interchangeably). The data source may include a plurality of cloud platforms, various on-premise data warehouses, data lakes, various databases accessible to an organization, and the like.

The data convener 130 may extract metadata from the obtained digital initiative data based on data analysis. The metadata may include information such as a data context, data relationships, data provenance, data auditability, data quality, and the like. The metadata may facilitate in tagging the data stored across the data sources. The metadata may facilitate the retrieval of data from the data source. The metadata may be a dataset that may provide information about another dataset. For example, the metadata extracted by the data convener 130 may provide information such as data context, data relationships, data provenance, data auditability, data quality, and the like about the digital initiative data. The data analysis may be performed by implementing an artificial intelligence component. The Artificial Intelligence (AI) component may include the implementation of various Machine Learning (ML), and natural language processing techniques for digital initiative data curation, storage, and retrieval.

The data convener 130 may classify the digital initiative data into a plurality of data domains (also referred to as data domains hereinafter). Each of the plurality of data domains may be pertaining to an attribute associated with the digital initiative. The attribute may be a measurable factor that may be used to distinguish one digital initiative from another. The data domains may be a set of categories where the digital initiative data may be classified based on the attribute. For example, the attribute associated with the digital initiative may include measurable factors such as data-name, a process associated with the digital initiative, data description, and the like. The data convener 130 may evaluate the plurality of data domains to identify a data usage pattern model associated with the digital initiative. The data usage pattern model may include various datasets that may be associated with the digital initiative. For example, a digital initiative may require a specified type of data cataloging, data quality management, and data curation. The data convener 130 may evaluate, and store the same as the data usage pattern model for that digital initiative. Additionally, a digital initiative may require a specified type of datasets for such as data related to the human resources of an organization. The data convener 130 may evaluate, and store the same as the data usage pattern model for that digital initiative. Further, the data convener 130 may evaluate user behavior for a particular digital initiative, and store the same as the data usage pattern model for that digital initiative. The data convener 130 may extract the metadata based on the data usage pattern model, and based on user behavior.

The data convener 130 may identify a data relationship between each of the data domains based on a training dataset. The training dataset may be derived using a rule database, and a recommendation database to extract the metadata. The rule database may be pre-defined by authorized personnel and stored in the system 110. The rule database may include rules for deriving relationships between the data stored in the data domains such as data interrelationships, and relevance for various operations. The recommendation database may include data recommendations for retrieving a dataset for a user based on various factors such as data usage, data relevance for that digital initiative, role of a user such as data steward, data custodian, and data consumer, user review, and score (explained in detail by way of the description for subsequent Figs.). Further, the recommendation database may include data recommendations for retrieving a dataset for a user based on the usage pattern model for the associated digital initiative. The training dataset may be datasets associated with the data extracting requirement that include pre-defined data relationships. The pre-defined data relationships may be derived from the rule database and the recommendation database.

The data convener 130 may generate a visual representation of the extracted metadata based on the data relationship between the plurality of data domains. The visual representation may include at least one of the data characteristics, data movements, and data transformations. For example, the visual representation of the metadata may include a tabular representation of the metadata for a digital initiative. The visual representation of metadata may include various attributes associated with the digital initiative.

The metadata extraction may facilitate integrating data quality checks, data governance, and personalized dataset for a user using ML, and AI techniques for data management resulting in process intelligence. Further, the metadata may serve as a data beacon for retrieving relevant digital initiative data from across the data sources. The data beacon may ensure trust in data by exploring various facets of data such as data context, data relationships, data provenance, data auditability, data quality, and the like. The data beacon may trace a data lineage to validate data veracity for a digital initiative. The AI, and ML techniques used for metadata extraction may be automated so that data may become easily locatable, and the data lineage may become traceable. The data beacon may facilitate data cataloging for the digital initiative data.

Further, the AI and ML techniques used for metadata extraction may facilitate to ensure effective data governance, thereby ensuring that data may be used properly, and organizational data policies may be coherently enforced across an organization. For example, effective data governance may enable an organization in identifying outliners, and bottlenecks for better decision making investments such as technology investments. The data beacon may facilitate in creating a profile for each user based on role, interest, and persona with interest clustered to target recommendations for relevant users. These profiles may be personalized based on user activity by leveraging ML on the digital initiative data obtained from different data sources. In an example, all the metadata information, and data recommendations may be stored in a DynamoDB table. In an example, the recommendation database may include a DynamoDB table.

The data curator 140 may determine a word index from a knowledge database. The word index may include a plurality of words associated with the digital initiative data. In accordance with various embodiments of the present disclosure, the knowledge database includes a natural language data directory. The data curator 140 may implement the AI component to determine the word index from the knowledge database. In an example, various Natural Language Processing (NLP) techniques may be used to determine the word index from the knowledge database.

The data curator 140 may map the plurality of words with the data domains to identify a data anomaly in the digital initiative data. In accordance with various embodiments of the present disclosure, the data curator 140 may predict the data anomaly based on the data usage pattern model associated with each of the plurality of digital initiatives. The ML algorithms that may be used enable error detection in data set may be based on data usage pattern model along with suggestions for rectification of detected errors. The data beacon may tag each of the data domains based on the plurality of words. For example, the data beacon may tag each of the domains according to the corresponding digital initiative. In an example, the data beacon may tag each of the data domains according to various user requirements. It must be appreciated by one skilled in the art that the data beacon may tag the data domains based on the plurality of words according to various factors such as associated operations, associated users, associated data sources, and the like.

The data curator 140 may determine an anomaly correction to the digital initiative data for resolving the data anomaly based on the word index. The data curator 140 may update the plurality of data domains to include the anomaly correction for the data anomaly. In accordance with various embodiments of the present disclosure, the data curator 140 may obtain a user input to update the plurality of data domains to include the anomaly correction for the data anomaly.

The data curator 140 may generate an anomaly correction marker for the updated plurality of data domains. The data beacon may tag each of the data domains wherein, the data anomaly may be identified. Further, the data beacon may tag each of the data domains wherein, the data anomaly may be rectified with the anomaly correction marker. In an example, the data beacon may tag each of the data domains wherein, the data anomaly may be identified but not rectified by the data curator 140. In accordance with various embodiments of the present disclosure, the data curator 140 may notify a user about the data domains wherein, the data anomaly may be identified but not rectified.

The modeler 150 may identify a user parameter associated with the digital initiative based on the rule database, and the recommendation database. The user parameter may be an identifier associated with the user. For example, a user may be one of a data steward, a data custodian, and a data consumer. The data requirements for the aforementioned users may be different from each other. Additionally, each user may be associated with a particular digital initiative. Therefore, data requirements for each user may vary according to the digital initiative. The modeler 150 may identify a unique identifier associated with each user. The unique identifier may be identified based on the rule database. In an example, each user may be associated with multiple user parameters such as type of user, a digital initiative associated with the user, and the like.

The modeler 150 may associate the user parameter with the metadata to identify the data usage pattern model associated with the user parameter. The modeler 150 may map the user parameter with the data beacon to identify the data usage pattern model relevant for that user. For example, the user parameter may include information about the type of user, and the digital initiative associated with the user. The data beacon may be the metadata associated with the digital initiative data relevant for the digital initiative associated with the user. The data beacon may include the metadata associated with each data pattern model relevant to the digital initiative associated with the user. The modeler 150 may map the user parameter with the data beacon to identify the data pattern model that may be relevant to both the user, and the digital initiative associated with the user.

The modeler 150 may retrieve the updated plurality of data domains within the data usage pattern model associated with the user parameter to create user parameter data associated with the user parameter. The updated data domains may be the data domains wherein the data anomaly may be rectified by the data curator 140. The user parameter data may be the digital initiative data within the data usage pattern model associated with the user parameter, and relevant for the digital initiative associated with the user. In an example, the modeler 150 may retrieve the updated plurality of data domains including the anomaly correction marker to create the user parameter data. In an example, the data curator 140 may map the plurality of words with the user parameter data to identify the data anomaly in the digital initiative data.

The modeler 150 may generate a data extraction result comprising the user parameter data associated with implementing the digital initiative. The data extraction result may include a curated dataset retrieved for a specific user from various data platforms for executing a digital initiative. The data extraction result may provide selective access to data to a user based on the user requirement and role in the digital initiative. In accordance with various embodiments of the present disclosure, the modeler 150 may generate the data extraction result to be accessible to each of the plurality of users across the plurality of cloud platforms, and the on-premise data warehouse for implementing a unique digital initiative from the plurality of digital initiatives.

In accordance with various embodiments of the present disclosure, the modeler 150 may perform a preprocessing operation on the digital initiative dataset associated with the digital initiative. The preprocessing operation may include removal of duplicate data values, removal of any data domains with missing data, removal outlier data, and the like. The modeler 150 may identify a preprocessed digital initiative dataset based on the preprocessing. The modeler 150 may generate a classification model for the preprocessed digital initiative dataset by associating the preprocessed digital initiative dataset with the user parameter data. The classification model may base based on the user parameter. In an example, the classification model may include usage factors such as user reviews. The modeler 150 may determine a count of negative words in a user review, a count of positive words, a count of reviews, a count of days since the last review, and the like to generate the classification model. The modeler 150 may determine a score for the preprocessed digital initiative dataset associated with the user parameter based on the classification model. Further, the modeler 150 may generate a recommendation for generating the data extraction result accessible to the user for resolving the data extracting requirement based on the score associated with the preprocessed digital initiative dataset (explained in detail by way of the description for the FIG. 6).

In accordance with various embodiments of the present disclosure, the modeler 150 may create a digital initiative library comprising the user parameters, the data pattern model, and the digital initiative dataset associated with each of the digital initiatives. The modeler 150 may deploy the digital initiative library for generating a digital initiative dataset for a subsequent data extracting requirement. In accordance with various embodiments of the present disclosure, the modeler 150 may require a user authentication from a user to generate the data extraction result for the user.

The modeler 150 may implement a data extraction action based on the data extraction result, the data extraction including retrieving the user parameter data associated with the digital initiative accessible to the user associated with the user parameter. In an example, the modeler 150 may require a user-input to implement the data extraction action to resolve the data extracting requirement based on the data extraction result. In another example, the modeler 150 may automatically implement the data extraction action to resolve the data extracting requirement based on the data extraction result. The system 110 may be configurable to perform the data extraction automatically, and/or based on user input.

The system 110 may further include a data delivery component to provide the data extraction result based on a consumption pattern defined by the user. In accordance with various embodiments of the present disclosure, the consumption pattern defined by the user may include at least one of an Application Program Interface (API) consumption pattern, a downloadable consumption pattern, a visualization consumption pattern, a Secure Shell File Transfer Protocol (SFTP) consumption pattern, and a data streaming consumption pattern (explained in detail by way of FIG. 10-16). For the sake of brevity, and technical clarity, few exemplary consumption patterns are described herein, however, it should be clear to a person skilled in the art that various other consumption patterns may be defined by the user without diverting from the scope of the disclosure. In an example, authorized personnel such as a data custodian may enable or disable any of the consumption patterns for other users based on access approval of each of the other users.

Figure 2:
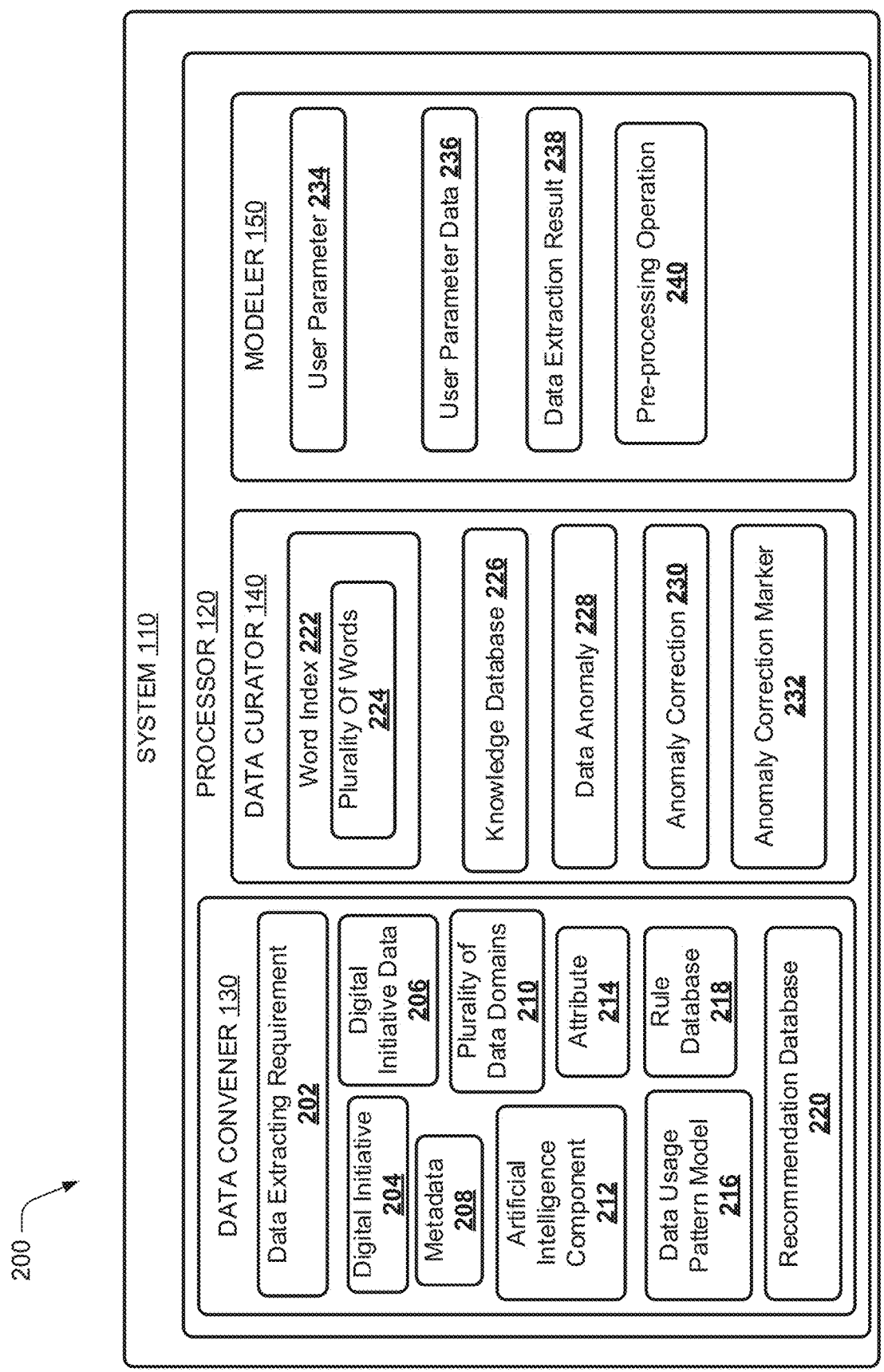
FIG. 2 illustrates various components of the data integration and curation system, according to an example embodiment of the present disclosure.

FIG. 2 illustrates various components of a data integration and curation system, according to an example embodiment of the present disclosure. The processor 120 may be coupled to the data convener 130, the data curator 140, and the modeler 150. In operation, the data convener 130 may receive a data extracting requirement 202 from a user. The data extracting requirement 202 may be associated with a digital initiative 204. In an example, the data extracting requirement 202 may include data extraction for a data user based on the role of the user. For example, the data extracting requirement 202 may be associated with extracting unique datasets for data stewards, a data custodian, and a data consumer in various consumption patterns determined by the user.

The data convener 130 may obtain digital initiative data 206 associated with the digital initiative from a data source. The data source may include various cloud platforms, and various on-premise data sources accessible to an organization. The data convener 130 may extract metadata 208 from the obtained digital initiative data 206 based on data analysis. The metadata 208 may serve as a beacon for retrieving the digital initiative data 206 from various data sources relevant to the digital initiative. The data convener 130 may implement an artificial intelligence component 212 for data analysis of the digital initiative data 206 for extracting the associated metadata 208. The artificial intelligence component 212 may include implementing various AI, and ML techniques for digital initiative data curation, storage, and retrievals such as NLP, intelligent data tagging, and the like.

The data convener 130 may classify the digital initiative data 206 into a plurality of data domains 210 (referred to as data domains 210 hereinafter). Each of the data domains 210 may be pertaining to an attribute 214 associated with the digital initiative. The attribute may be a facet of the digital initiative data 206 that may be quantified. The attribute 214 may facilitate distinguishing between the data domains 210. The data convener 130 may evaluate the data domains 210 to identify a data usage pattern model 216 associated with the digital initiative 204. The data usage pattern model 216 may include various datasets, and data usage patterns that may be associated with the digital initiative 204. For example, a particular dataset may have been used multiple times for executing a particular digital initiative. The data usage pattern model 216 may store the metadata 208 related to such datasets.

Further, the data convener 130 may identify a data relationship between each of the data domains 210 based on a training dataset. As mentioned above, data convener 130 may implement various ML techniques for data analysis. Each of the ML techniques may require the creation of a unique model. The training dataset may be used to train an ML model that may be created for implementing a particular ML technique. The training data may be derived using a rule database 218 recommendation database 220 (explained further by way of the description for FIG. 4). The metadata 208 extracted after the data analysis may be used as a beacon to retrieve data for a user. In an example, the metadata 208 may include data categories such as business name, description, business unit, program manager, function, tag, table name, database name, rows/volume, size, current format, file location, created on, last updated on, created by, available formats, API availability, downloads, user ratings, and the like. Further, the metadata 208 may be associated with quality, risk, and relevance of the digital initiative data 206.

The data curator 140 may determine a word index 222 from a knowledge database 226. The word index 222 may include a plurality of words 224 associated with the digital initiative data 206. The data curator 140 may implement various techniques such as NLP to map the plurality of words 224 with the data domains 210 to identify a data anomaly 228. The data anomaly 228 may be an error in the data, a duplication data value, an entry with missing data, outlier data, and the like. The data curator 140 may determine an anomaly correction 230 to the digital initiative data 206 for resolving the data anomaly 228 based on the word index 222. The data curator 140 may implement various error detection algorithms based on NLP for the determination of the anomaly correction 230. The data curator 140 may rectify the data anomaly 228 with the anomaly correction 230 in the associated data domains 210. The data curator 140 may generate an anomaly correction marker 232 for the updated plurality of data domains 210. The anomaly correction marker 232 may tag the data domains 210 according to the data anomaly 228. For example, the anomaly correction marker 232 may generate tags for the data domains 210 based on the data domains 210 with no data anomaly 228, the data domains 210 with rectified data anomaly 228, the data domains 210 with non-rectified data anomaly 228, and the like.

The modeler 150 may identify a user parameter 234 associated with the digital initiative based on the rule database 218, and the recommendation database. The user parameter may be a distinction for each type of user. The modeler 150 may associate the user parameter 234 with the metadata 208 to identify the data usage pattern model 216 associated with the user parameter 234. The modeler 150 may map the user parameter 234 with the data beacon to identify the data pattern model that may be relevant to both the user, and the digital initiative associated with the user. The modeler 150 may retrieve the updated plurality of data domains 210 within the data usage pattern model 216 associated with the user parameter 234 to create user parameter data 236 associated with the user parameter 234. The modeler 150 may implement a machine learning model to create the user parameter data 236 associated with a digital initiative, and relevant for a user. The modeler 150 may generate a data extraction result 238 comprising the user parameter data 236 associated with implementing the digital initiative.

In accordance with various embodiments of the present disclosure, the modeler 150 may perform a preprocessing operation on the digital initiative dataset associated with the digital initiative. The preprocessing operation may include removal of duplicate data values, removal of any data domains 210 with missing data, removal outlier data, and the like dataset (explained in detail by way of the description for the FIG. 6). The preprocessing operation may create customized datasets that may be used to generate the data extraction result 238.

Figure 3:
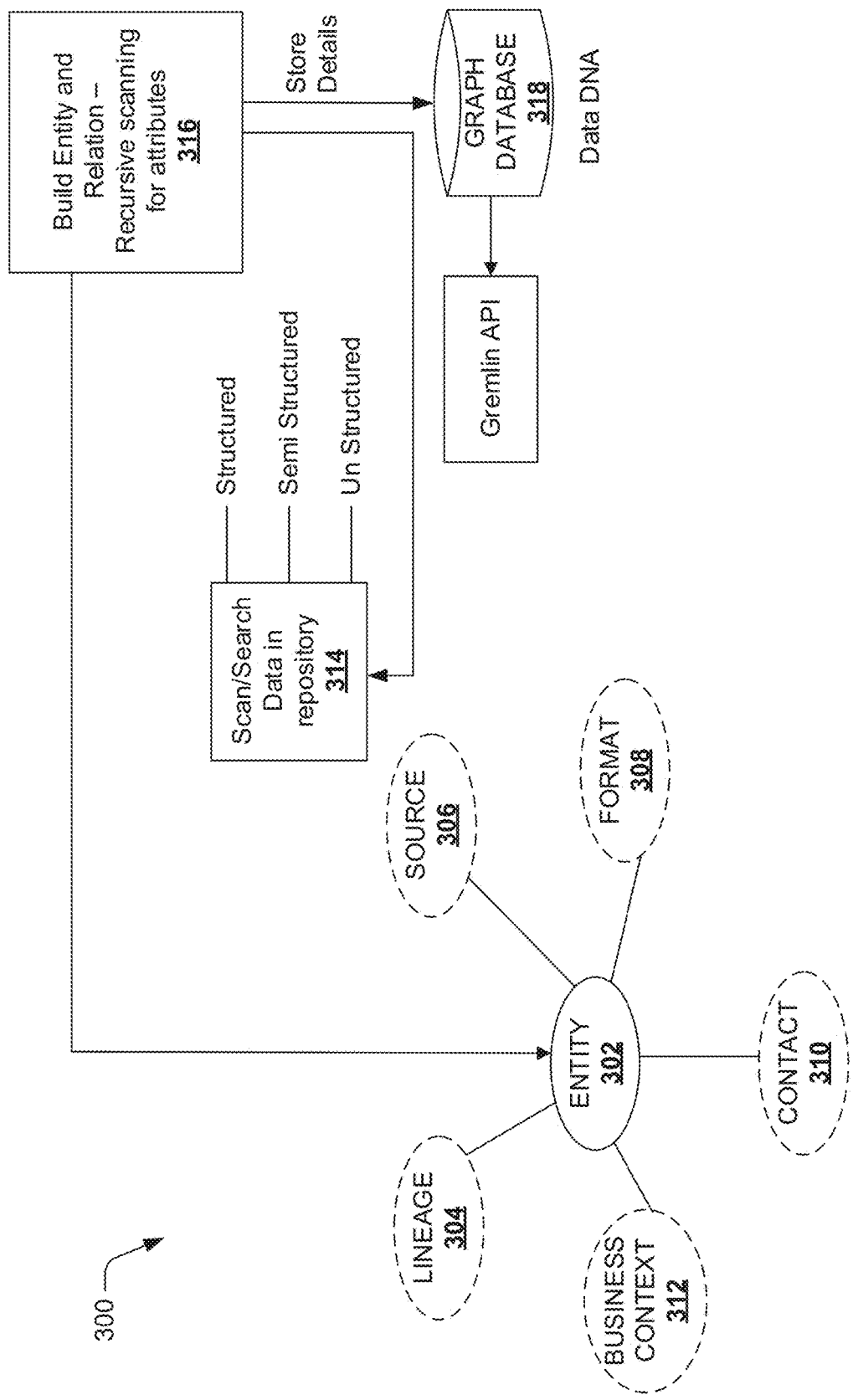
FIG. 3 illustrates the creation of personalized data using the data integration and curation system, according to an example embodiment of the present disclosure.

FIG. 3 illustrates the creation of a personalized dataset 300 using the data integration and curation system, according to an example embodiment of the present disclosure. All the components described by the way of the description for FIG. 1, and FIG. 2 may be referred to herein. In an exemplary embodiment of the present disclosure, the system 110 may scan a data repository 314. The data repository 314 may include various cloud platforms, various on-premise databases, and other external databases accessible to an organization. The digital initiative data 206 may be stored in the data repository 314. The data repository 314 may include structures, semi-structured, and unstructured data. The system 110 may identify a data entity 302 from the data repository 314. The data entity 302 may be associated with a digital initiative. The system 110 may execute a recusing scanning 316, wherein the data attributes 214 for the data entity 302 may be identified, and a relationship may be built amongst them. For example, the attributes 214 associated with the data entity 302 may include measurable factors such as data-name, a process associated with the digital initiative, data description, and the like. The system 110 may extract metadata 208 associated with the data entity 302. The metadata 208 may include a data lineage 304, a data source information 306, a data format 308, a data contact 310, and a data context 312. The metadata 208 for the data entity 302 may be extracted using the recursive scanning 316.

The metadata 208 may be stored in a graph database 318. The graph database 318 may generate a visual representation of the extracted metadata 208 based on the data relationship between the plurality of data domains 210. In an example, the visual representation may include data characteristics, data movements, and data transformations. For example, the visual representation of the metadata 208 may include a tabular representation of the metadata 208 for the data entity 302. In an example, the visual representation of metadata 208 may include the various relations between the data lineage 304, the data source information 306, the data format 308, the data contact 310, and the data context 312 for the data entity 302. In an example, the graph database 318 may be based on Gremlin® API.

Figure 4:
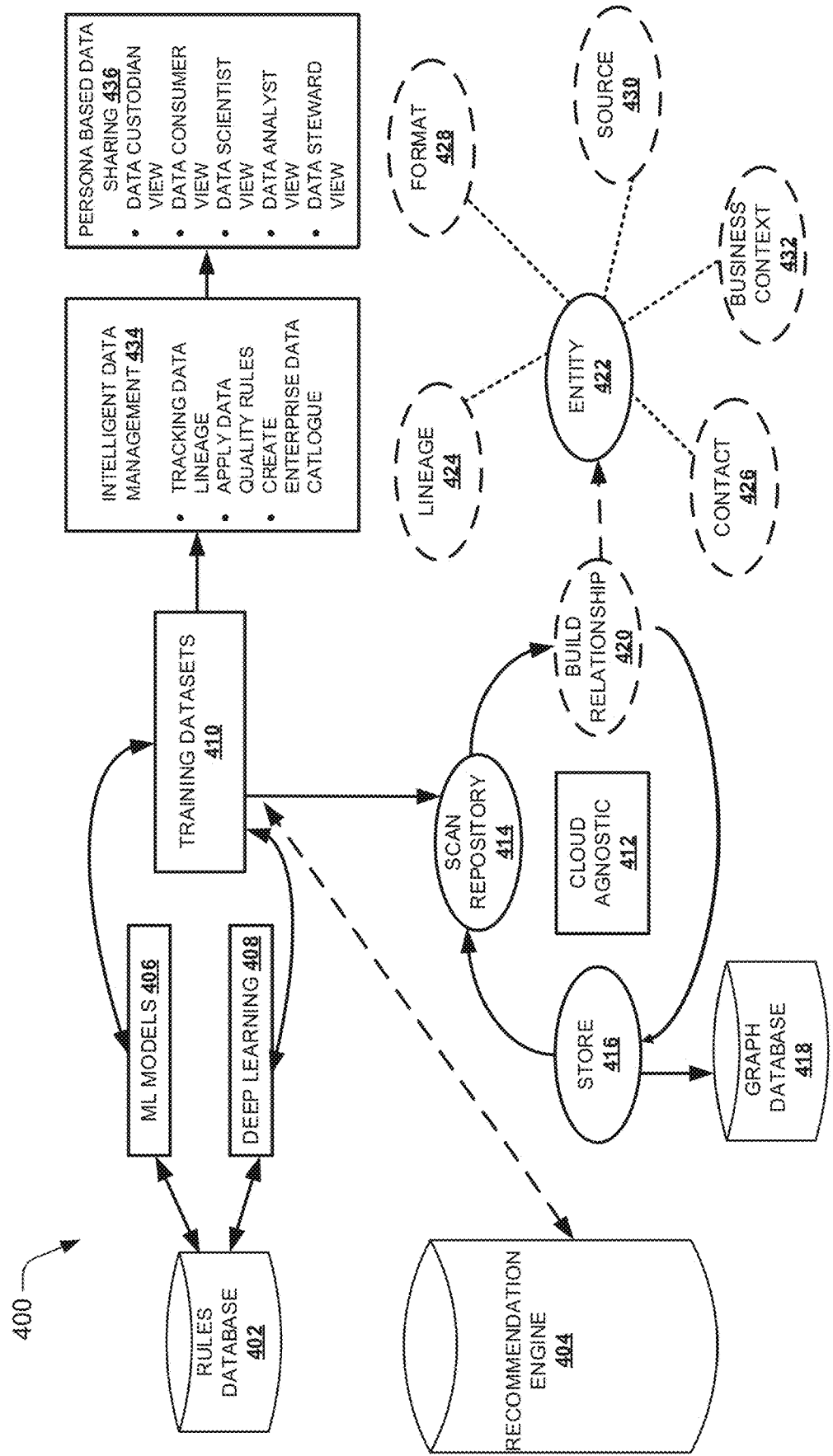
FIG. 4 illustrates an architecture diagram of the creation of personalized data using the data integration and curation system, according to an example embodiment of the present disclosure.

FIG. 4 illustrates an architecture diagram 400 of the creation of personalized data using the data integration and curation system, according to an example embodiment of the present disclosure. All the components described by the way of the description for FIG. 1, and FIG. 2 may be referred to herein. The system 110 may identify a data entity 422. The system 110 may include a rule database 402, and a recommendation engine 404. The rule database 402 may be the rule database 218. The recommendation engine 404 may be the recommendation database 220. The rule database 402 may include a set of rules for extracting the metadata 208 for the data entity 422.

The system 110 may further include an ML model component 406, and a deep learning component 408. In an example, various ML models for data analysis such as error detection, data processing, NLP, and the like may be stored in the ML model component 406. In an example, various deep learning models for metadata 208 extraction may be stored in the deep learning component 408. The rule database 402 may include conditions for implementing various ML models, and deep learning models stored in the ML model component 406, and the deep learning component 408. The system 110 may obtain a part of the digital initiative data 206 to train the models stored in the ML model component 406, and the deep learning component 408. The system 110 may create a training dataset 410 based on implementing the rules from the rule database 402 on the models stored in the deep learning component 408, and the ML model component 406. Further, the training dataset 410 may receive input from the recommendation engine 404. The recommendation engine 404 may include various dataset recommendations for each type of user. For example, the recommendation engine 404 may include data requirement recommendations for a data steward, a data custodian, a data consumer, and the like. The recommendation engine 404 may be used to augment the training of the ML models, and deep learning models stored in the ML model component 406, and the deep learning component 408. ML model component 406, and the deep learning component 408 may update the model stored therein based on an update in the rule database 402, the recommendation engine 404, and the digital initiative data 206. Additionally, the training datasets 410 may be updated based on updates in the rule database 402, the recommendation engine 404, the ML model component 406, and the deep learning component 408. In an example, the training datasets 410 may be used to train the ML models for applying concepts such as neural networks, to learn, and produce results. The training datasets 410 may include both input data, and expected output data.

The system 110 may use the training datasets 410 to scan a data repository 414. The data repository 414 may be the data repository 314. In an exemplary embodiment, the data repository 414 may be a metadata 208 repository. In an example, supervised ML techniques may be used with data labeling, and tagging using an organizational pipeline involving both a set of participants and a set of volunteers. The supervised ML models may scan entire data repository 414, and label datasets present therein based on the rules present in the rule database 402, and the recommendation engine 404.

The data repository 414 may use the training datasets 410 to execute a relationship building 420. The relationship-building 420 may include recursive scanning 316 of the attributes 214 associated with the data entity 422. The recursive scanning 316 may use ML and deep learning models to enable error detection in the data entity 422. The use of ML and Deep Learning (DL) techniques may automate metadata 208 extraction so that data becomes easily locatable, and data lineage becomes traceable. Additionally, the ML and DL models may enable metadata 208 extraction based on user behavior. Further, the ML and DL models may rectify the detected errors based on historical data, user behavior. In an example, the ML, and DL models may rectify errors based on mapping the data entity 422 with the plurality of words 224. The relationship-building 420 may identify relationships between similar data records that may be a part of the same data entity such as the data entity 422 for a particular user. For example, a user may prefer a particular consumption pattern for a specific dataset, the relationship-building 420 may leverage DL, and ML models to identify such data relationships. It must be appreciated by a person skilled in the art that the relationship-building 420 may identify any kind of relationships, patterns, and data trends for the data stored on the data repository 414. Further, the ML and DL models may identify the data usage pattern model 216$s$ for each user associated with each digital initiative based on the training datasets 410, the relationship-building 420, the deep learning component 408, the ML model component 406, the rule database 402, and the recommendation engine 404. The ML and DL models may create a data beacon in the form of metadata 208 associated with each data usage pattern model 216 for each user associated with each digital initiative. Further, the ML and DL models may create a data beacon in the form of metadata

208 associated with various consumption patterns. The data beacon may include metadata 208 information associated with a dataset. The data beacon may be used to trace the dataset across multiple cloud platforms, and databases. The ML and DL models may associate the data beacon for the consumption pattern with the data beacon for each data usage pattern model 216 for each user associated with each digital initiative for extracting relevant data for users in a required consumption pattern.

The system 110 may implement a storage 416, wherein the system 110 may store results from the recursive scanning 316. The storage 416 may also be used to store results from executing the relationship building 420. The storage 416 may include various relationships between metadata 208 extracted for the data entity 422. For example, the metadata 208 may include a data lineage 424, a data source information 430, a data format 428, a data contact 426, and a data context 432. The storage 416 may include the various relations between the data lineage 424, the data source information 430, the data format 428, the data contact 426, and the data context 432 for the data entity 422 stored in a graph database 418, which may be similar to graph data base 318.

The recursive scanning 316, the training datasets 410, the relationship-building 420, the deep learning component 408, the ML model component 406, the rule database 402, and the recommendation engine 404 may be used by the system 110 for intelligent data management, as illustrated by block 434. The intelligent data management may include applying AI, DL, and ML for data governance, and metadata 208 management to ensure data may be used properly, and policies may be coherently enforced across an organization to enable identification of outliners, and bottlenecks for better decision making. The intelligent data management may facilitate to create a profile for each user based on role, interest, and persona with interest clustered to target recommendations for relevant users. These profiles may be hyper-personalized by leveraging ML on the digital data generated from different access platforms based on user activity. The intelligent data management may integrate data quality checks, metadata 208 management, data governance, and hyper-personalized data creation using ML, and DL techniques. The data facets such as the data lineage 424, the data source information 430, the data format 428, the data contact 426, and the data context 432 may be created as part of the data beacon to ensure trust in data by exploring data context, data relationships, data provenance, data auditability, and data quality.

For example, if a user may want to understand, and a relationship between a Customer (C), and a Store (S) to show personalized data for only those stores which the customer may visit based on customer's feature preference. The recursive scanning 316 may perform an exploratory analysis between two datasets (C, S). In an example, this step may be done using R. Below are a sequence of steps that may be followed:

Dim(C)->nrows(C)->ncols(C)->head(C,n=x),tail(C,n-x)->names(C)->levels(C)
Dim(S)->nrows(S)->ncols(S)->head(S,n=x),tail(S,n-x)->names(S)->levels(S)

A correlation may be calculated between the C, and the S. A randn( ) function may be used to generate random values with a mean of "0", and a standard deviation of "1". The results may be multiplied by a common standard deviation, and the mean may be added therein to shift values into a preferred range. A scatter plot may be created as a visual representation of the correlation. A covariance may be calculated between the C, and S. The covariance may be used to summarize a linear relationship between two variables. The recursive scanning 316 may include a polynomial/cubic regression function for non-linear relationships. Once relationship may be defined between datasets then end to end data lineage may be plotted based on data characteristics, movements, and transformations to give a complete audit trail of data.

The recursive scanning 316 may implement a feature engineering technique using the ML, and DL models to identify a list of features that may impact the choice of a store by a customer. For example, the list of features identified by the recursive scanning 316 may be frequency, recency, location, product features, brand popularity, neighborhood, and the like. Further, the recursive scanning 316 may identify the ML model that may be aligned with the feature engineering approach. For example, a Random Forest Method (RFM) may be used to establish a relationship as this method may not assume pre-specified relationships between a response, and a predictor. The RFM may convert the data either in a numerical format or a binary format. The RFM may implement a Gini criterion on the converted data. The Gini criterion is used to denote the decrease in the node impurity function. It is one of the most commonly used tree-building criteria to measure node impurity for categorical target values.

Further, the recursive scanning 316 may build an ML model. For example, the Random Forest model is built for the training datasets with the independent variable as "Store". Additionally, the Gini score may indicate that state and brand popularity may be the most common features affecting a customer's choice of any particular store. Once a relationship may be defined between the datasets, then end to end data lineage may be plotted based on data characteristics, movements, and transformations to give a complete audit trail of data.

Figure 5:
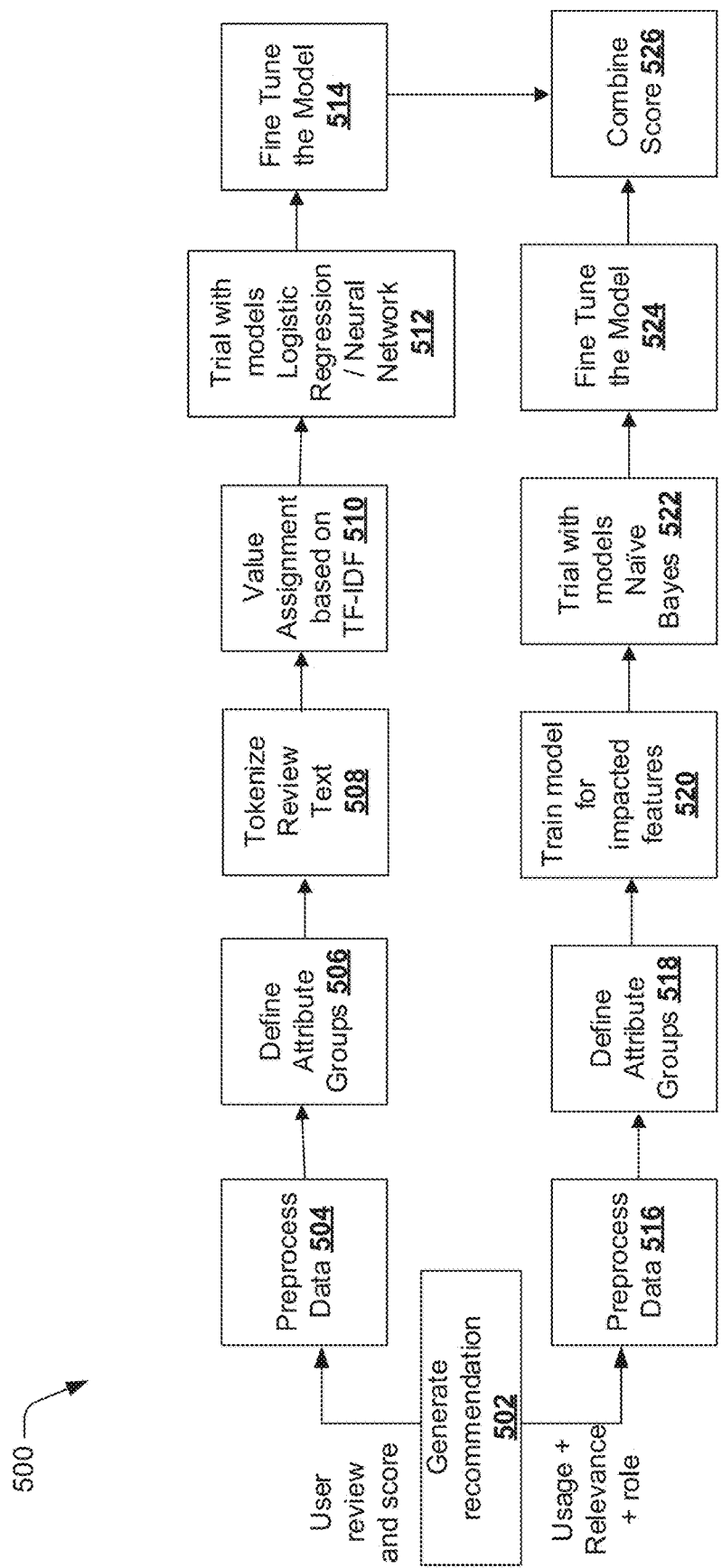
FIG. 5 illustrates a flow diagram of a recommendation database used for the creation of personalized data, according to an example embodiment of the present disclosure.

FIG. 5 illustrates a flow diagram 500 of the recommendation database 220 used for the creation of personalized data, according to an example embodiment of the present disclosure. All the components described by the way of the description for FIG. 1, and FIG. 2 may be referred to herein. The recommendation database 220 may be used to serve datasets based on data usage, data relevance, data user role, data user review, and a data score. In an example, a dataset may be collected from a data beacon user interface, where factors such as user data set requests, request frequency, and the like may be captured along with the text reviews from users for datasets, and numerical scores. The system 110 may leverage a logistic model to train the dataset to be able to recommend the dataset based on data usage, data relevance, data user role, data user review, and a data score. The ML model used by the recommendation database 220 may join the text reviews from the users with various numerical features to build a classification model for generating the recommendations.

The system 110 may include a recommendation generation 502. The recommendation generation 502 may generate recommendations to serve datasets based on data usage, data relevance, data user role, data user review, and a data score. The recommendation generation 502 may generate recommendations based on the user review, and the data score. In an example, the recommendation generation 502 may generate recommendations based on data usage, data relevance, and data user role. In an example, wherein the recommendation generation 502 may generate recommendations based on the user review, and the data score, the system 110 may implement a data preprocessing 504. The system 110 may define an attribute group set 506 based on the data preprocessing 504. The attribute group set 506 may help in a tokenizing process 508 of the text present in the text review. The system 110 may implement an AI technique such as NLP for the tokenizing process 508. The tokenizing process 508 may be a process of tokenizing or splitting a string, or a text into a list of tokens. The token may be parts of the text. For example, a word may be a token in a sentence, and a sentence may be a token in a paragraph. The system 110 may use the word index 222 for the tokenizing process 508.

The tokenizing process 508 may be followed by a value assignment 510. The value assignment 510 may assign values to each of the token created by the tokenizing process 508. In an example, the value assignment 510 may use techniques such as Term Frequency-Inverse Document Frequency (TF-IDF). The TF-IDF may be a numerical statistic that may be intended to reflect the importance of a word in a document in a collection or a corpus. For example, the TF-IDF may be used to analyze the user reviews of the data. Further, the system 110 may create a trial model 512 using results from the value assignment 510. The trial model 512 may include logistic regression models, neural network-based models, and the like. The recommendation database 220 may further implement a fine-tuning 514, wherein the trial model 512 may be fine-tuned. The fine-tuning 514 may attribute a score to the trial model 512. The score may be attributed to the recommendations generated by the trial model 512.

In an example, wherein the recommendation generation 502 may generate recommendations based on the data usage, data relevance, and data user role, the system 110 may implement a data preprocessing 516. The system 110 may define an attribute group set 518 based on the data preprocessing 516. The attribute group set 518 may be related to the data usage, data relevance, and data user role associated with a data entity. The attribute group set 518 may be used for a training 520. The training 520 may train a model for identifying attributes 214 that may be associated with the data usage, data relevance, and data user role. Further, the system 110 may create a trial model 522. In an example, the trial model 522 may be created using the Naïve Bayes technique. The Naïve Bayes technique is a classification technique based on Bayes' Theorem with an assumption of independence among predictors. The Naive Bayes classifier assumes that the presence of a particular feature in a class may be unrelated to the presence of any other feature. For example, the Naïve Bayes technique may be based on assumption that presence of an attribute associated with the data usage, data relevance, and data user role may independent of the presence of any other associated with the data usage, data relevance, and data user role. The recommendation database 220 may further implement a fine-tuning 524, wherein the trial model 522 may be fine-tuned. The fine-tuning 524 may attribute a score to the trial model 522. The score may be attributed to the recommendations generated by the trial model 522. Further, the recommendation database 220 may execute a score combination 526, wherein score from the trial model 522, and the score for the trial model 512 may be combined to generate a final score for a recommendation.

Figure 6:
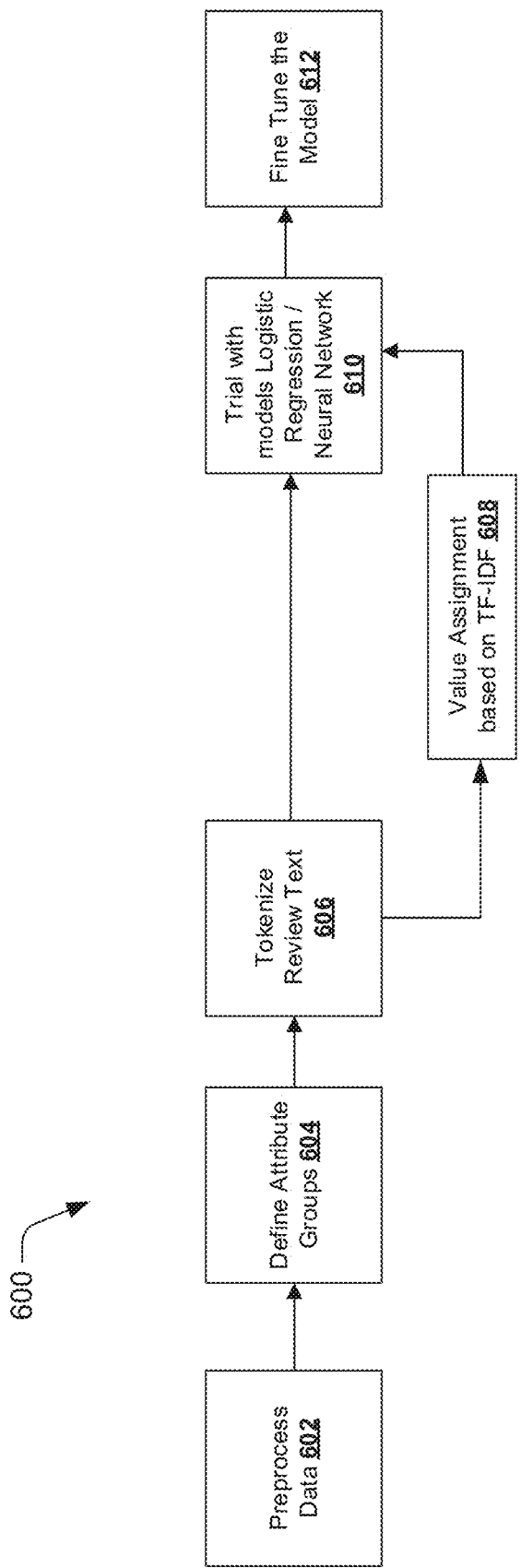
FIG. 6 illustrates a flow diagram of training an artificial intelligent (AI) model used by the recommendation database used for the creation of personalized data, according to an example embodiment of the present disclosure.

FIG. 6 illustrates a flow diagram 600 of training an artificial intelligent (AI) model used by the recommendation database 220 used for the creation of personalized data, according to an example embodiment of the present disclosure. All the components described by the way of the description for FIG. 1, and FIG. 2 may be referred to herein. In an example, wherein the recommendation generation 502 may generate recommendations based on the user review, and the data score, the system 110 may implement a data preprocessing 602. The data preprocessing 602 may include removal of duplicate data values, removal of any data domains 210 with missing data, removal outlier data, and the like.

For example, the data preprocessing 602 may process the attributes 214 associated with the user review, such as review date, average_dataset_score, dataset name, user_role,negative_review, review_total_negative_word_count, review_total_positive_word_count,total_number_Reviews,user_score, days_since_review, and the like. The data preprocessing 602 may identify a target variable to a "user score" for a review. The system 110 may define an attribute group set 604 based on the data preprocessing 602. For example, the system 110 may divide the attributes associated with the user review into categories such as low, medium, and high. In an example, if the user score value <5 then low, if user score >=6, and <8, and <=2, then medium, and if user score >=9, and <-10 then high. In an example, the score levels may be defined based on explorative visualization.

The attribute group set 604 may help in a tokenizing process 606 of the text present in the text review. The system 110 may implement an AI technique such as NLP for the tokenizing process 606. The tokenizing process 606 may be a process of tokenizing or splitting a string, or a text into a list of tokens. The token may be parts of the text. For example, a word may be a token in a sentence, and a sentence may be a token in a paragraph. The system 110 may use the word index 222 for the tokenizing process 606. The system may use a Bi-gram Tokenization to neglect tokenizing various stop words.

The tokenizing process 606 may be followed by a value assignment 608. The value assignment 608 may assign values to each of the token created by the tokenizing process 606. In an example, the value assignment 608 may use techniques such as the TF-IDF. The TF-IDF information retrieval may be done based on following Equation:

$$\text{Value Assignment} = Wt,d = TFt,d \ \log(N/DFt) \quad \text{Equation 1}$$

Wherein,
TFt,d=count of occurrences of tin review d.
DFt=count of reviews containing the term t.
N=total count of reviews in the corpus.

For example, the TF-IDF may be used to analyze the user reviews of the data. Further, the system 110 may create a trial model 610 using results from the value assignment 608. In an example, the trial model 610 may include a logistic regression model such as XBoost. The trial model may identify significant attributes associated with the data user review such as total_neg_words_std, total_positive_words_std, average_score_std, and the like. The recommendation database 220 may further implement a fine-tuning 612, wherein the trial model 610 may be fine-tuned. For example, all reviews may be bucketed taking into account the review score, and review text for a particular data set. The fine-tuning 612 may attribute a score to the trial model 610. The score may be attributed to the recommendations generated by the trial model 610.

Figure 7:
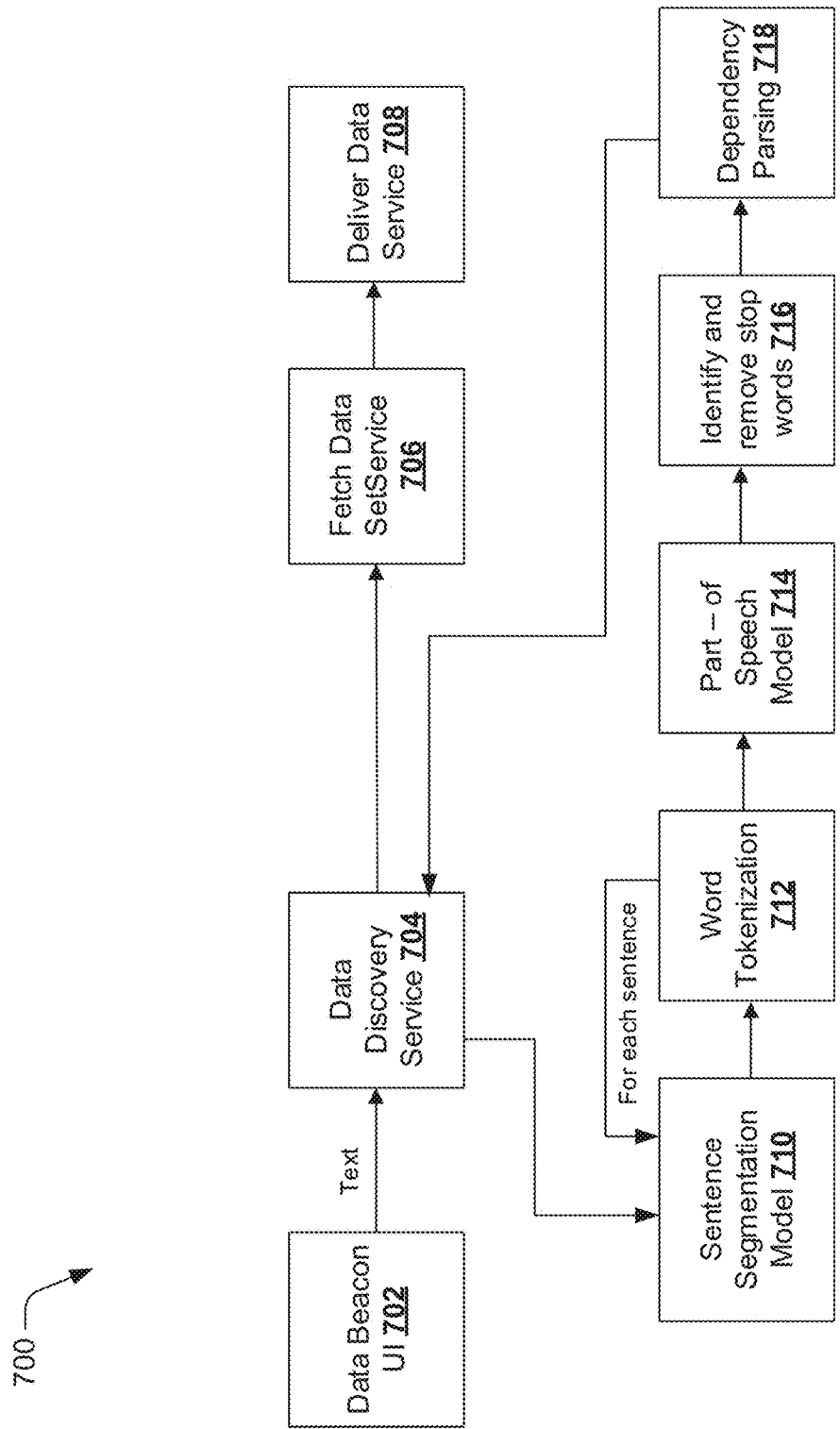
FIG. 7 illustrates a flow diagram of a process of augmented data discovery for automation of data delivery to a user, according to an example embodiment of the present disclosure.

FIG. 7 illustrates a flow diagram 700 of a process of augmented data discovery for automation of data delivery to a user, according to an example embodiment of the present disclosure. All the components described by the way of the description for FIG. 1, and FIG. 2 may be referred to herein. The system 110 may execute an augmented data delivery process. The augmented data delivery process may help in automating the delivery of datasets to users by incorporating NLP techniques. The system 110 may include a data beacon user interface 702. The data beacon user interface 702 may be integrated with a voice service to capture the voice of a user. The data beacon user interface 702 may use a Web Speech API along with a Speech Recognition API, speech-to-text API, and ML. The voice service may capture the voice of the user, and the data extracting requirement 202. For example, the voice service may capture a message "I need a dataset in FS Domain. It must contain the customer data along with the orders. This needs to be placed in the server at IP 'X.X.X.X' via SFTP".

The system 110 may execute a data discovery 704. The data discovery 704 may extract text from the speech captured by the data beacon user interface 702. The data discovery 704 may include a containerized service to take the text input, and execute the NLP pipeline to extract the meaning from the text sent.

The data discovery 704 may create a sentence segmentation model 710 for the text input received. The sentence segmentation model 710 may break the text into separate sentences. In an example, various libraries like Natural Language Toolkit® (NLTK), Spacy®, CoreNLP, and the like may be leveraged by the sentence segmentation model 710. In an example, the sentence segmentation model 710 may include implementing a bidirectional Long Short Term Memory network+Conditional Random Field (BiLSTM+CRF) sequence tagging model along with pre-trained word embeddings. For example, the sentence segmentation model 710 may create sentences such as "I need a dataset in FS Domain", "It must contain the customer data along with the orders", "This needs to be placed in the server at IP 'X.X.X.X' via SFTP".

Further, the system 110 may implement a word tokenization 712 for each sentence created by the sentence segmentation model 710. The word tokenization 712 may break the sentence created by the sentence segmentation model 710 into separate words. For example, the word tokenization 712 may break the sentences into words such as "I", "need", "a", "dataset", "in", "FS Domain", "It", "must", "contain", "the", "customer data", "along", "with", "the", "orders", "This", "needs", "to", "be", "placed", "in", "the", "server", "at", "IP", "X.X.X.X", "via", "SFTP".

The system 110 may execute a parts-of-speech model 714 after the word tokenization 712. The parts-of-speech model 714 may be pre-trained with all the English language sentences related to the digital initiative data 206. For example, the parts-of-speech model 714 may identify "I" as a Pronoun, "need" as a Verb, "a" as a "determiner", "dataset" as a noun, and the like. The system may execute an identification 716, wherein any stop words may be identified and removed from the text input. The system 110 may include a pre-defined list of stop words that may need to be removed from the text input. In an example, the pre-defined list of stop words may be stored in the system by authorized personnel. In an example, the system 110 may be configurable to automatically detect stop words from a word corpus such as a natural language directory, and use the same for the identification 716. For example, the list of stop words may include Dataset, FS Domain, Customer, Server, IP, X.X.X.X, SFTP.

The system 110 may execute a dependency parsing 718. The dependency parsing 718 may include building a tree and generating a Simple Query Language (SQL) data string from the text input. The dependency parsing 718 may send the SQL data string to the data discovery 704. The system 110 may execute a fetch dataset service 706. The fetch dataset service 706 may include obtaining the SQL data string from the data discovery 704. The fetch dataset service 706 may be followed by a deliver data service 708 wherein, the dataset may be delivered to a user. Accordingly, the system 110 may leverage AI for automating various repetitive tasks in the process of data retrieval thereby increasing the productivity of a user and an organization.

Figure 8:
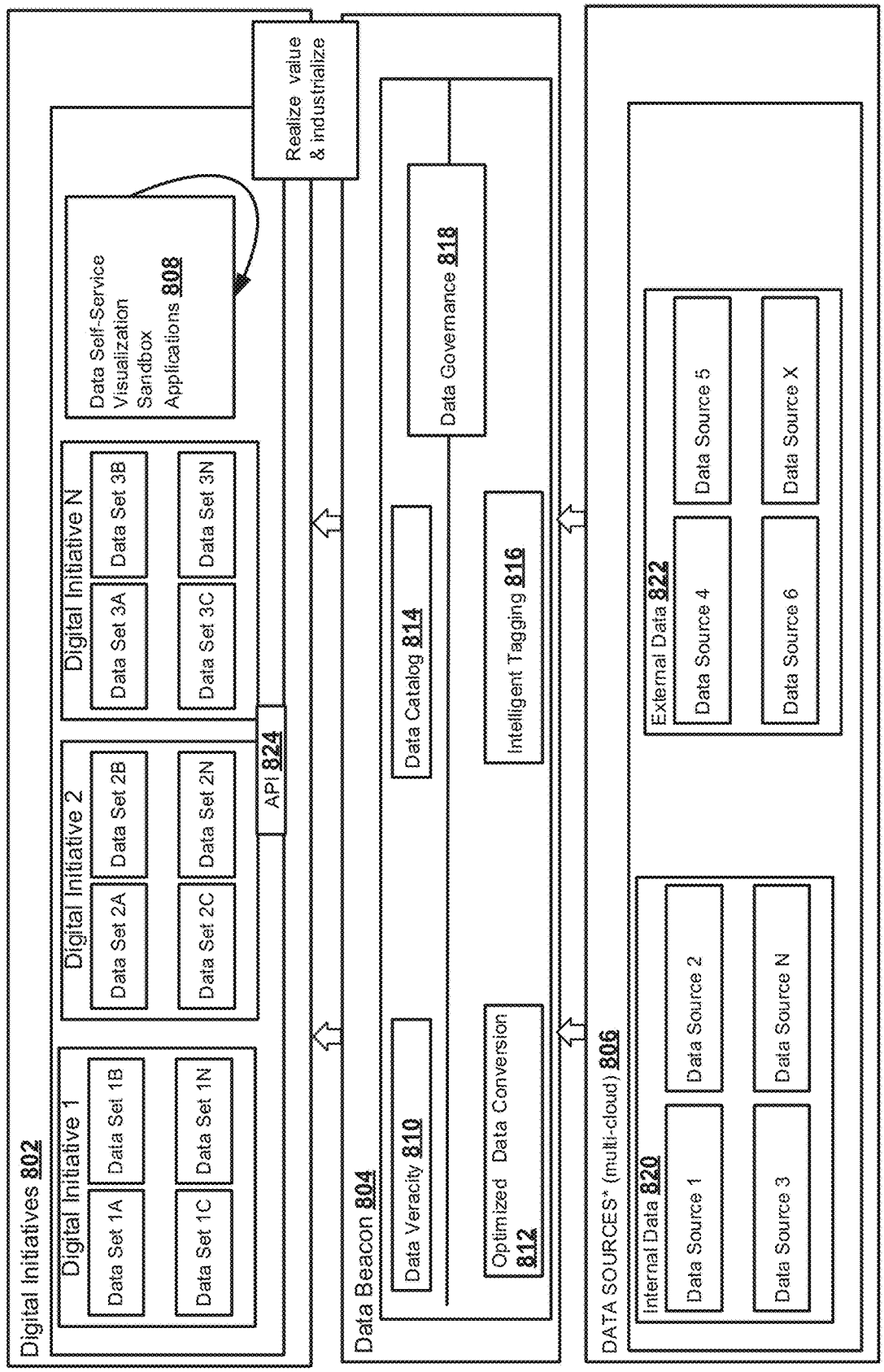
FIG. 8 illustrates a placement diagram of the data integration and curation system in a data environment, according to an example embodiment of the present disclosure.

FIG. 8 illustrates a placement diagram 800 of the data integration and curation system in a data environment, according to an example embodiment of the present disclosure. All the components described by the way of the description for FIG. 1, and FIG. 2 may be referred to herein. The placement diagram 800 includes an environment wherein the system 110 may be deployed for data extraction. The placement diagram 800 may include a digital initiative set 802, a data beacon application 804, and a data source set 806. The digital initiative set 802 may include a Digital Initiative 1, a Digital Initiative 2, and Digital Initiative N. The Digital Initiative 1 may further include a data set 1A, a data set 1B, a data set 1C, and a data set 1D. Each of the data set 1A, the data set 1B, the data set 1C, and the data set 1D may be the digital initiative data 206 associated with the Digital Initiative 1. The Digital Initiative 2 may further include a data set 2A, a data set 2B, a data set 2C, and a data set 2D. Each of the data set 2A, the data set 2B, the data set 2C, and the data set 2D may be the digital initiative data 206 associated with the Digital Initiative 2. The Digital Initiative N may further include a data set NA, a data set NB, a data set NC, and a data set ND. Each of the data set NA, the data set NB, the data set NC, and the data set ND may be the digital initiative data 206 associated with the Digital Initiative N.

The data beacon application 804 may include a data veracity component 810, a data catalog component 814, an optimized data conversion component 812, an intelligent tagging 816. The data veracity component 810, the data catalog component 814, the optimized data conversion component 812, and the intelligent tagging 816 may contribute towards data governance 818. The data source set 806 may include an internal data source set 820, and an external data source set 822. The internal data source set 820 may include a data source 1, a data source 2, a data source 3, a data source N. The internal data source set 820 may include various internal databases, and various on-premise data platforms wherein, the digital initiative data 206 may be stored. The external data source set 822 may include a data source 4, a data source 5, a data source 6, a data source X. The external data source set 822 may include various external databases, and various cloud platforms wherein, the digital initiative data 206 may be stored.

The data beacon application 804 may retrieve data from the data source set 806. The data beacon application 804 may implement the data veracity component 810 on the data to check the veracity of data. The data beacon application 804 may create a data catalog using the data catalog component 814. The data beacon application 804 may implement the optimized data conversion component 812 to convert data formats, and invoke various consumption patterns. The data beacon application 804 may implement the intelligent tagging 816 to tag the data from the data source set 806. The data beacon application 804 may use an API 824 to industrialize the data after implementing the data veracity component 810, the data catalog component 814, the optimized data conversion component 812, and the intelligent tagging 816. Further, the system 110 may include a data visualization component 808 for creating a visual representation of the data retrieved by the API 824. The API 824 may provide data for the digital initiative set 802. The data governance 818 may include verifying access approval for a user before sending data to the API 824.

Figure 9:
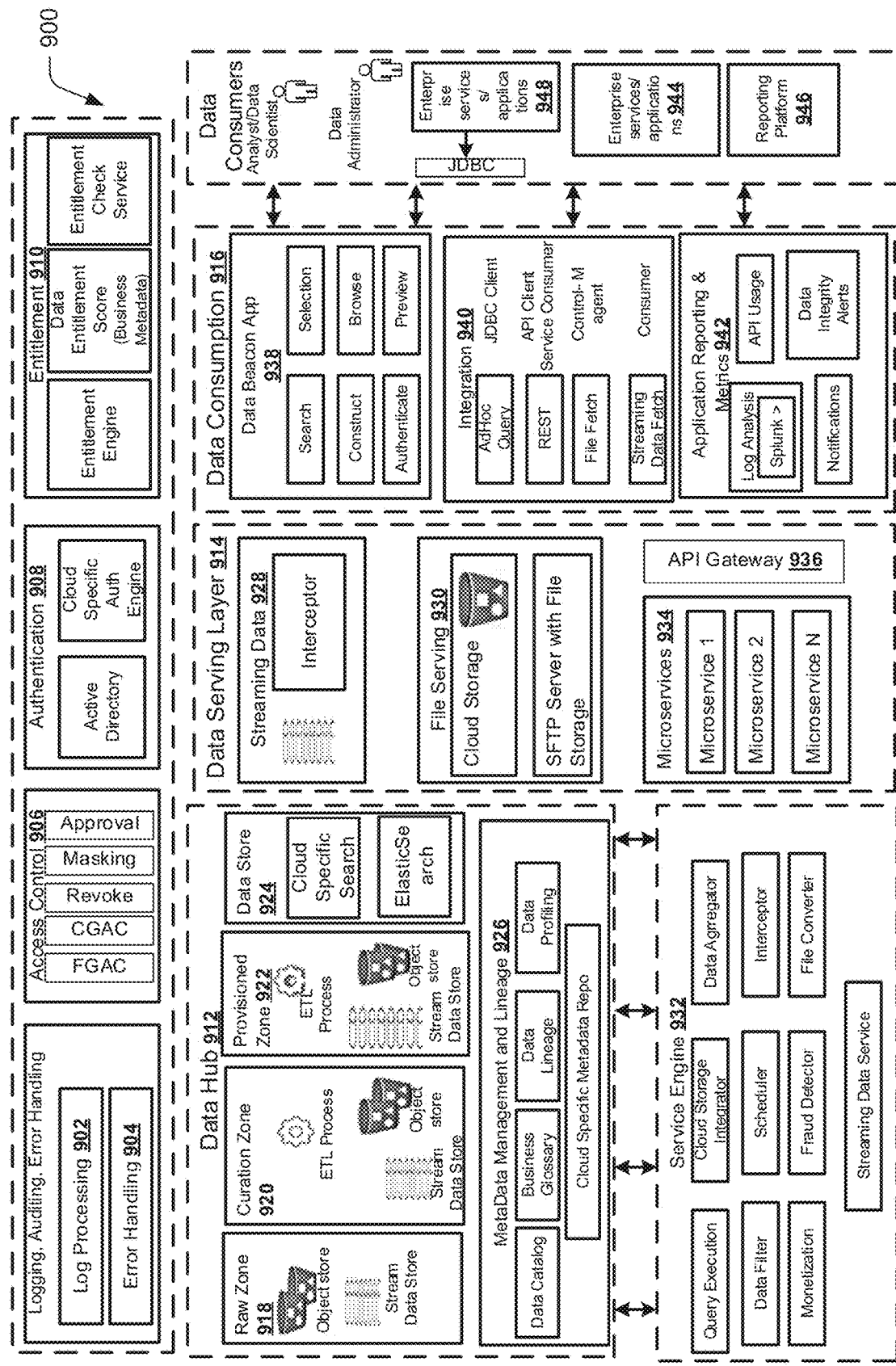
FIG. 9 illustrates a technical architecture of the data integration and curation system, according to an example embodiment of the present disclosure.

FIG. 9 illustrates a technical architecture 900 of the data integration and curation system 110, according to an example embodiment of the present disclosure. All the components described by the way of the description for FIG. 1, and FIG. 2 may be referred to herein. The system 110 may include a log processing component 902, an error handling component 904, an access control component 906, an authentication component 908, and an entitlement component 910. The log processing component 902 may obtain the data extracting requirement 202 from various users of the system 110. The log processing component 902 may include an audit log database for logging the user requests, and activity. The error handling component 904 may rectify any errors in the data extracting requirement 202. The access control component 906 may verify access approval for each user submitting the data extracting requirement 202. The authentication component 908 may check for identity, and access approval for authenticating internal users, and Cognito for external user authentication. The authentication component 908 may authenticate each user using an active directory and a cloud specific authentication engine. The active directory may be used for maintaining internal users along with associated roles. The entitlement component 910 may determine data entitlement of a user. The entitlement component 910 may use an entitlement API, and entitlement Store which may check each user's access to cloud-based services based on role assigned to a user. An example of such cloud-based services includes, but is not limited to, Amazon Web Service® (AWS®) resources. Although the present disclosure is explained with reference to accessing AWS resources, it will be appreciated that any other cloud-based service may also be used. One of ordinary skill in the art will appreciate that the present disclosure is directed to a multi cloud solution. The entitlement store may have details about the set of access, and permissions against a particular role.

Further, the system 110 may include a datahub 912. The data hub 912 may include a raw zone 918, a curation zone 920, a provisioned zone 922, a data store 924, and a metadata management and lineage 926. The datahub 912 may be in communication with a service engine 932. The service engine 932 may include various tools embedded there in for data sanitization, data analysis, data fraud detection, and the like. The system 110 may include a data serving layer 914. The data serving layer may include a set of streaming data 928, a file serving component 930, an API gateway 936, and a microservices component 934.

The system 110 may include a data consumption component 916. The data consumption component 916 may include a data beacon application 938, a application integration 940, an application reporting and matrix 942. The data consumption component 916 may interact with the data consumers. The system 110 may include a reporting platform 946, a service application 944, and an enterprise application 948. The data consumption component 916 may interaction with data consumers such as a data steward, a data custodian, and a data consumer through the reporting platform 946, the service application 944, and the enterprise application 948.

Figure 10:
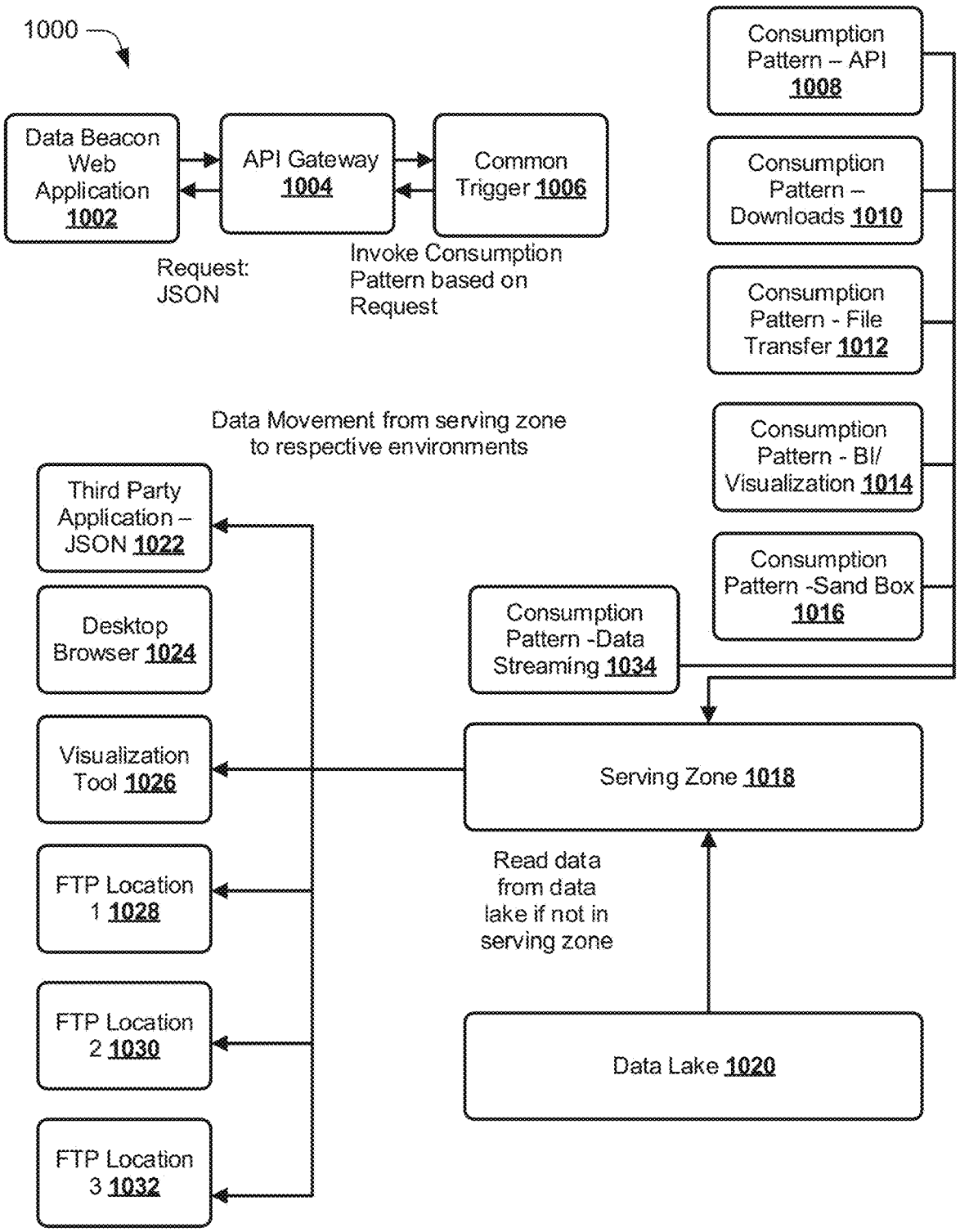
FIG. 10 illustrates a flow diagram for a data consumption pattern, according to an example embodiment of the present disclosure.

FIG. 10 illustrates a flow diagram for a data consumption pattern, according to an example embodiment of the present disclosure. All the components mentioned above may be referred to hereinafter. The system 110 may include a data beacon application 1002. The data beacon application 1002 may be connected to an API gateway 1004. In an exemplary embodiment, the data beacon application 1002 may communicate with the API gateway 1004 in a JavaScript Object Notation (JSON) format. The API gateway 1004 may be connected to a common trigger 1006. In accordance with various embodiments of the present disclosure, the API gateway 1004 may be the Amazon API Gateway®. The common trigger 1006 may invoke a consumption pattern based on a request from the user.

In an example, the consumption pattern defined by the user comprises at least one of an API consumption pattern 1008, a downloadable consumption pattern 1010, a visualization consumption pattern 1014, an SFTP consumption pattern 1012, and a data streaming consumption pattern 1034. In an example, the consumption pattern may further include a sandbox consumption pattern 1016. The consumption pattern may be a data consumption format preferred by a user for implementing a digital initiative. In an example, the system 110 may be configured to implement serverless computing for invoking the consumption pattern and sending the same to a serving zone 1018. In accordance with various embodiments of the present disclosure, the serverless computing may be implemented using AWS Lambda® serverless computing platform. For example, the system 110 may implement serverless computing to invoke the API consumption pattern 1008, the downloadable consumption pattern 1010, the visualization consumption pattern 1014, the SFTP consumption pattern 1012, the data streaming consumption pattern 1034, and the sandbox consumption pattern 1016 for sending to the serving zone 1018. Further, the system 110 may implement serverless computing for data movement from the serving zone 1018 to respective user environments. In an example, the system 110 may read data from a data lake 1020, and send the same to the serving zone 1018 for data movement from the serving zone 1018 to respective user environments. In an example, the user environment may include a third party application 1022, a desktop browser 1024, a visualization tool 1026, an FTP location 1 1028, FTP location 2 1030, and an FTP location 3 1032. The serving zone 1018 may move data in form of any of the aforementioned consumption patterns to any of the aforementioned user environments.

In an example, when a user may select a dataset for consumption, each dataset is delivered using a consumption pattern such as listed above. A request object may be created depending upon the consumption configuration. For example, if a user may select one dataset using an API, and another dataset in the visualization tool 1026, then the request object may have requests set for the API, and the visualization tool 1026. The system 110 may map the user environment with the consumption pattern. Table 1 presented herein presents a few examples of the mapping between the user environment, and consumption pattern. For the sake of brevity, the terms used in table 1 are not being described herein, however, it should be clear to a person skilled in the art.

TABLE 1

| Access Type | Consumption Pattern | Target | Format | ServiceMapping |
|---|---|---|---|---|
| Data Access | API | Not Required | CSV, XML, JSON, Parquet, Avro | dataAccess - dataAPI |
| Data Access | Downloads | Not Required | CSV, XML, JSON, Parquet, Avro | dataAccess - downloads |
| Data Access | File Transfer | Amazon Simple Storage Service | CSV, XML, JSON, Parquet, Avro | dataAccess - fileTransfer - sftpS3 |
| Environment Access | Sandbox | EC2 | CSV, XML, JSON, Parquet, Avro | envAccess-EC2 |
| Environment Access | Visualization | Tableau | CSV, XML, JSON, Parquet, Avro | envAccess - biVisualization - tableau |
| Environment Access | Visualization | Amazon Quick Sight | CSV, XML, JSON, Parquet, Avro | envAccess - biVisualization - quickSight |
| Environment Access | Visualization | Power BI | CSV, XML, JSON, Parquet, Avro | envAccess - biVisualization - powerBI |

Figure 11:
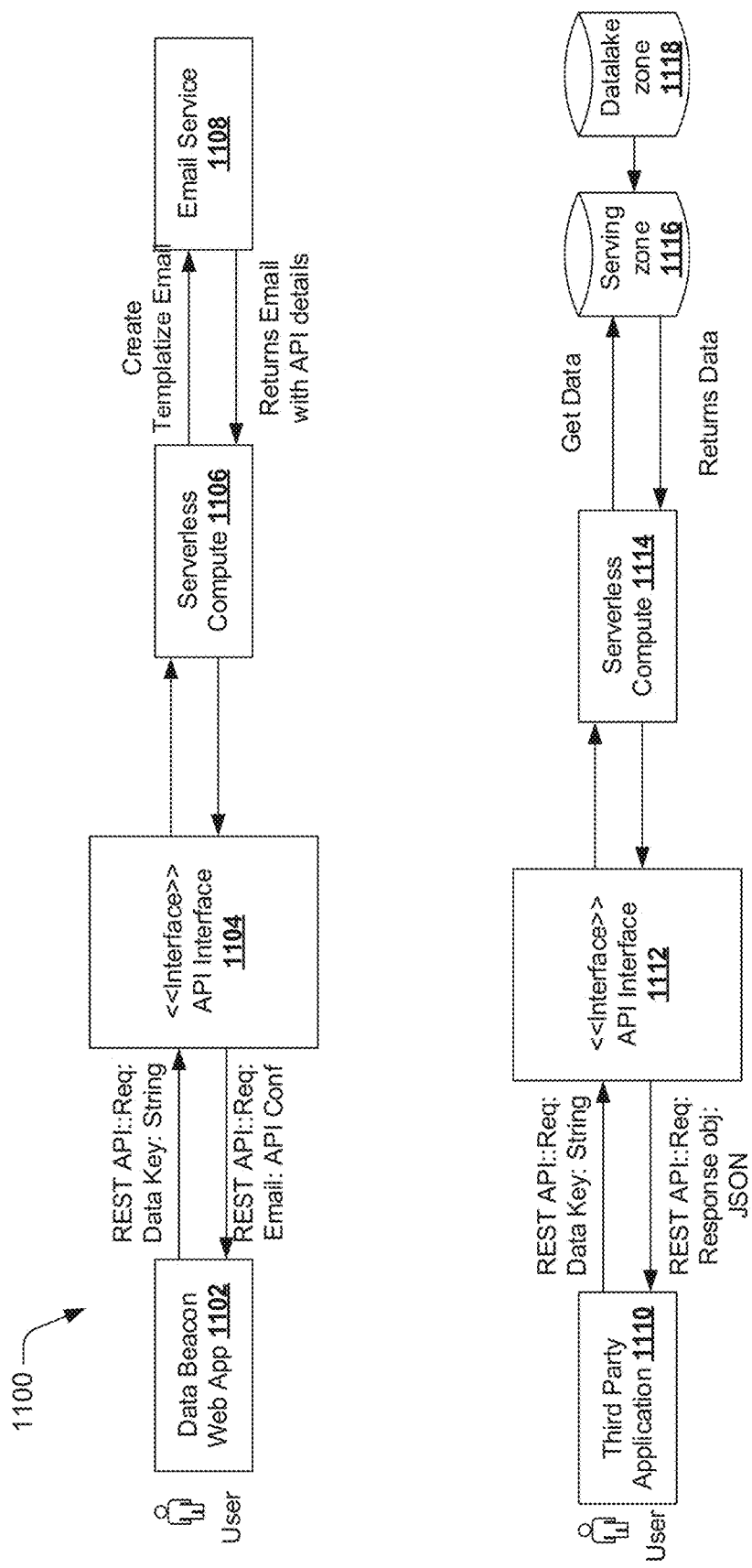
FIG. 11 illustrates a flow diagram for an Application Program Interface (API) data consumption pattern for downloading, according to an example embodiment of the present disclosure.

FIG. 11 illustrates a flow diagram for an Application Program Interface (API) data consumption pattern for downloading, according to an example embodiment of the present disclosure. All the components mentioned above may be referred to hereinafter. In an example, the consumption using API may be used when a user wants to consume the data in a third-party application. The data may be consumed in the specified formats(refer to table). A user may need to configure for the API, and in response to that, an email notification may be triggered. The email notification may have all the details such as requested datasets, and API method type, request identifier, input, and output data structures, and the like. The API may be invoked by a user in its environment or any third-party application.

In an example, as illustrated a user may interact with a data beacon application 1102. The data beacon application 1102 may interact with an API gateway 1104. In an exemplary embodiment, the data beacon application 1102 may communicate with the API gateway 1104. A request object may be created based on the interaction of the data beacon application 1102, and the API gateway 1104. The system 110 may further include a serverless computing component 1106. The serverless computing component 1106 may create an email using an email service 1108. In an example, the email service may be Amazon Simple Email Service® (SES). The email service 1108 may return the created email including API details to the serverless computing component 1106. The serverless computing component 1106 may interact with the API gateway 1104. The API gateway 1104 may resolve the request object for the API consumption pattern, and provide the created email to the user. In an example, an email notification may be provided to the user about the API details such as method type, request, and response structures, and the like.

In an example, as illustrated, the user may invoke the API details on a third party application for data extraction. The user may interact with a third party application 1110. The third-party application 1110 may interact with an API gateway 1112. In an exemplary embodiment, the third-party application 1110 may communicate with the API gateway 1112. A request object may be created based on the interaction of the third party application 1110, and the API gateway 1112. The system 110 may further include a serverless computing component 1114. The serverless computing component 1114 may get data from a serving zone in 1116. In an example, the serving zone 1116 may be the serving zone 1018. The serving zone 1116 may read data from a data lake 1118. In an example, the data lake 1118 may use the Amazon Simple Storage Service® (S3). In an example, the data lake 1118 may be the data lake 1020. The serving zone 1116 may send the data via the serverless computing component 1114 to the API gateway 1112. The user may retrieve the data using the third-party application 1110 from the API gateway 1112.

Figure 12:
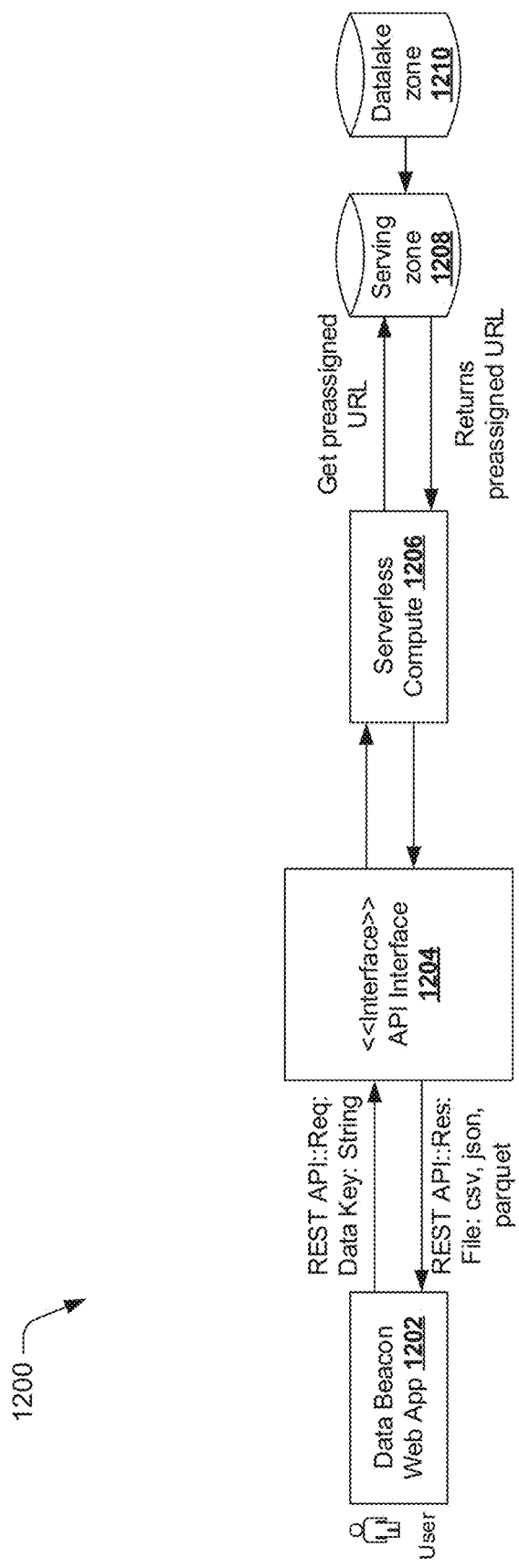
FIG. 12 illustrates a flow diagram for a downloading data consumption pattern for file sharing, according to an example embodiment of the present disclosure.

FIG. 12 illustrates a flow diagram for a downloading data consumption pattern for file sharing, according to an example embodiment of the present disclosure. All the components mentioned above may be referred to hereinafter. In an example, consumption using downloads may be used when a user may want to directly consume the data as a downloadable link via a system 110 browser.

In an example, as illustrated a user may interact with a data beacon application 1202 for data extraction. The data beacon application 1202 may interact with an API gateway 1204. A request object may be created based on the interaction of the data beacon application 1202 may interact with the API gateway 1204. The system 110 may further include a serverless computing component 1206. The serverless computing component 1206 may get data from a serving zone 1208. In an example, the serving zone 1208 may be the serving zone 1018. The serving zone 1208 may read data from a data lake 1210. In an example, the data lake 1210 may use the Amazon Simple Storage Service® (S3). In an example, the data lake 1210 may be the data lake 1020. The serving zone 1208 may send the data such as a download link Uniform Resource Locator (URL) via the serverless computing component 1206 to the API gateway 1204. The user may download the data using the data beacon application 1202. The data may be consumed as a file which can be in any of the formats such as a CSV format, a JSON format, a parquet format, an XML format, an Avro format, and the like. In an example, the file may be downloaded through a link listed in an order history page included in the user application such as the data beacon application 1102.

Figure 13:
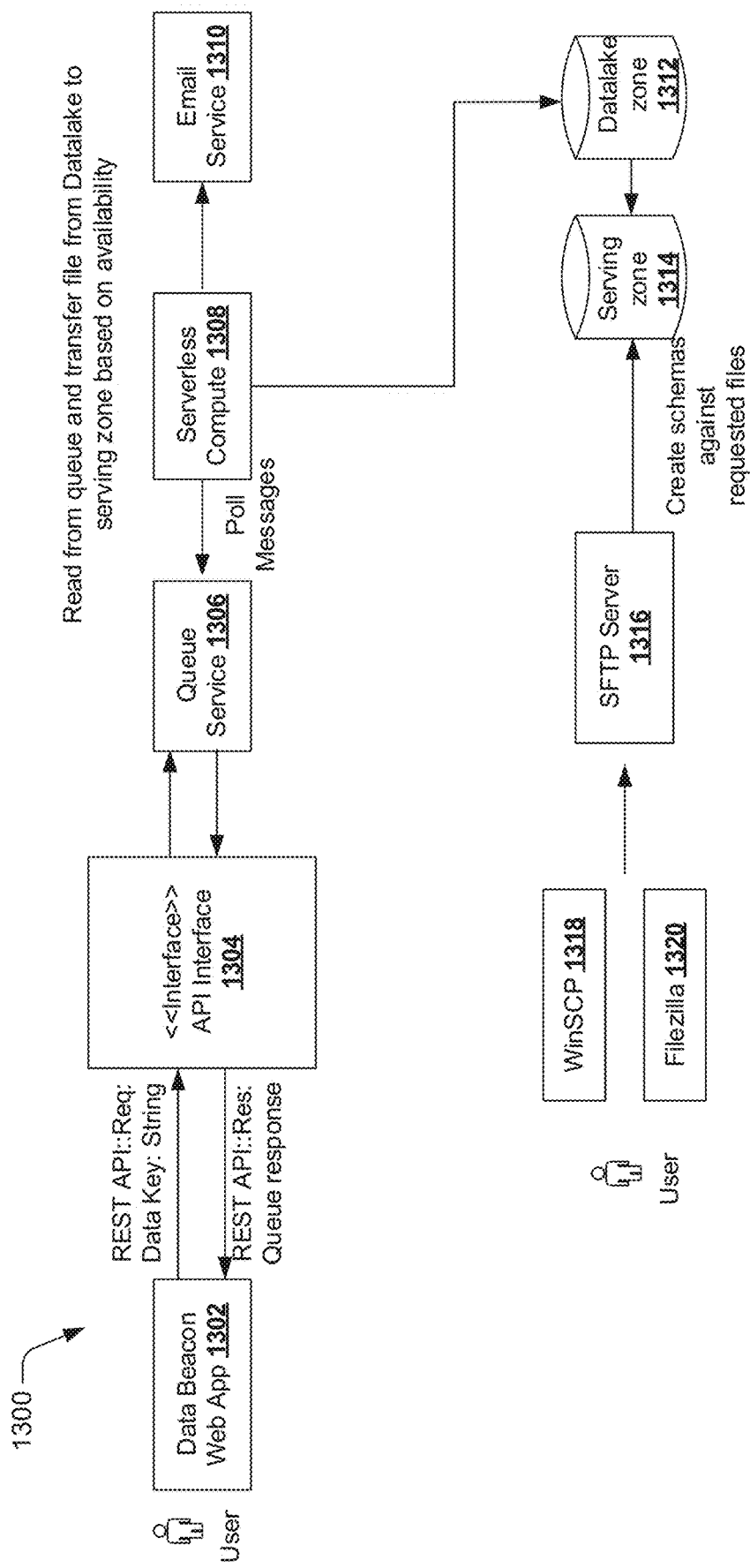
FIG. 13 illustrates a flow diagram for a file transfer data consumption pattern, according to an example embodiment of the present disclosure.

FIG. 13 illustrates a flow diagram for a file transfer data consumption pattern, according to an example embodiment of the present disclosure. All the components mentioned above may be referred to hereinafter. In an example, consumption pattern using file transfers such as SFTP may be used when a user may want to consume the data in its shared repository or drive using the FTP protocol for secured data access. The data may be consumed in formats such as the CSV format, the JSON format, the parquet format, the XML format, the Avro format, and the like.

In an example, as illustrated a user may interact with a data beacon application 1302. The data beacon application 1302 may interact with an API gateway 1304. A request object may be created based on the interaction of the data beacon application 1302, and the API gateway 1304. The system 110 may further include a queuing service component 1306. In an example, the queuing service component 1306 may use Amazon Simple Queue Service® (SQS). The system 110 may further include a serverless computing component 1308. The serverless computing component 1308 may be in communication with a data lake 1312. In an example, the data lake 1312 may use the Amazon Simple Storage Service® (S3). In an example, the data lake 1312 may be the data lake 1020. The data lake 1312 may be in communication with a serving zone 1314. In an example, the serving zone 1314 may be the serving zone 1018. The serving zone 1314 may read data from the data lake 1312. The serverless computing component 1308 may read data from queuing service component 1306, and transfer file from the data lake 1312 to the serving zone 1314 based on availability. The serverless computing component 1308 may create an email using an email service 1310. A user may need to configure for the SFTP consumption under the file transfer option presented by the data beacon application 1302. In response to that, a messaging queue will take user requests for datasets. Once the datasets are available on FTP location, a user is notified, and may access the data using clients such as a WinScp® application 1318, a Filezilla® application 1320, and the like with help of a SFTP server 1316. In an example, the SFTP server 1316 may use cloud based web services, such as, for example, Amazon Web Services® (AWS), Transfer for SFTP. An email notification may be sent to the user with server configuration details such as endpoint, port. A compute function may be implemented using SFTP service to transfer data from the data lake 1312 to serving zone 1314 based on the access level of a user as per the policy.

Figure 14:
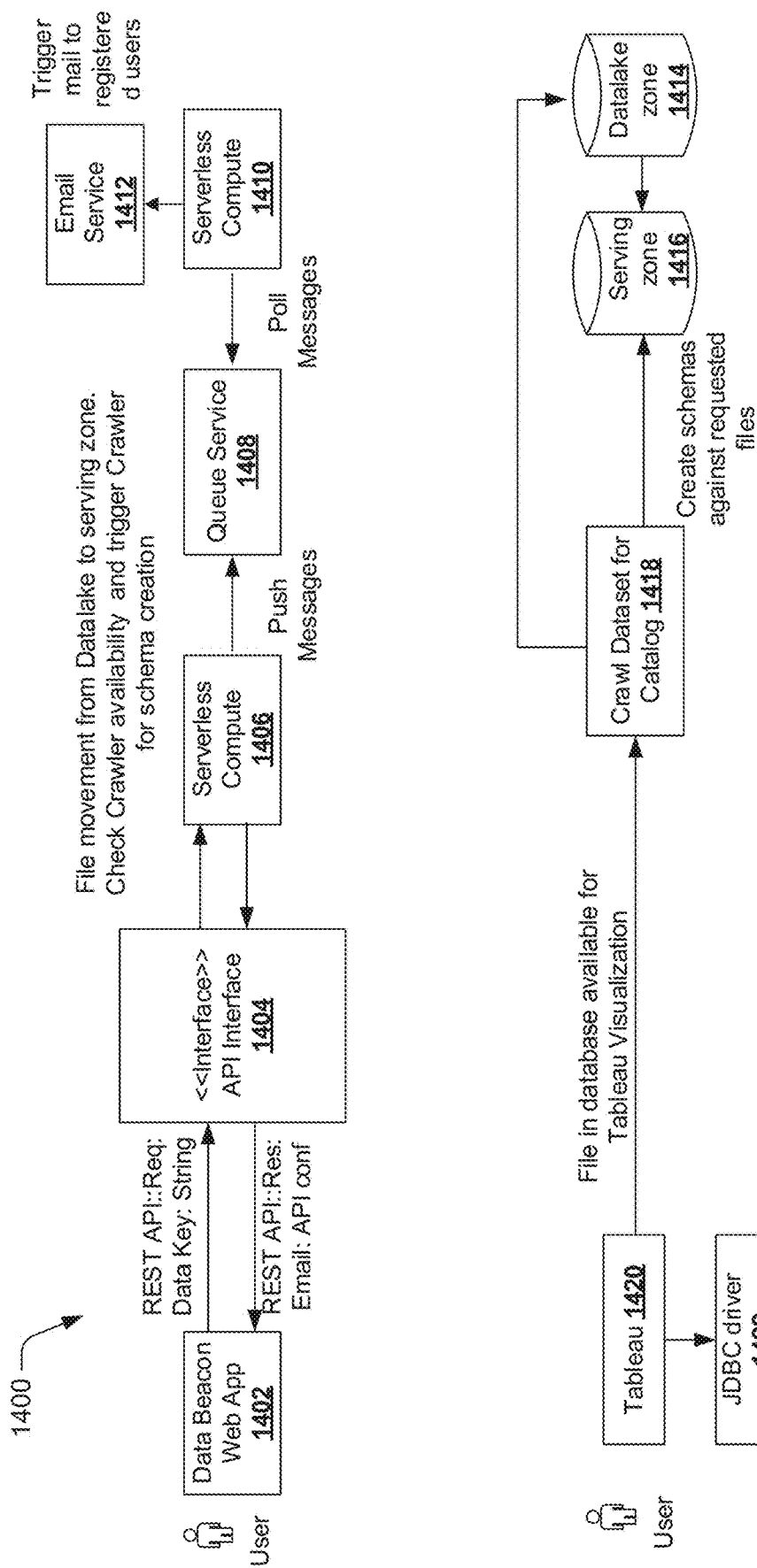
FIG. 14 illustrates a flow diagram for a visualization data consumption pattern, according to an example embodiment of the present disclosure.

FIG. 14 illustrates a flow diagram for a visualization data consumption pattern, according to an example embodiment of the present disclosure. All the components mentioned above may be referred to hereinafter. In an example, the visualization consumption pattern may enable a user to consume data in some visualization tool such as Tableau®, AWS® Quicksight®, PowerBI®, and the like. The data may be consumed in formats such as the CSV format, the JSON format, the parquet format, the XML format, the Avro format, and the like.

When a user invokes the visualization consumption pattern 1014, an AWS® service glue may crawl the data in S3®, and populates the various tables in a database. These tables may be identified by a tool such as AWS Athena® which is an integration link between Tableau®, and AWS®. The Tableau® may need to have a driver to connect to the AWS Athena®. Once connection may be established, the Tableau® may automatically identify, and pull data in its environment via the AWS Athena®.

In an example, as illustrated a user may interact with a data beacon application 1402. The data beacon application 1402 may interact with an API gateway 14104. In an exemplary embodiment, the data beacon application 1402 may communicate with the API gateway 1404 in the JSON format. A request object may be created based on the interaction of the data beacon application 1402, and the API gateway 1404. The system 110 may further include a serverless computing component 1406. The serverless computing component 1406 may interact with a queuing service component 1408. In an example, the queuing service component 1306 may use Amazon Simple Queue Service® (SQS). The system 110 may further include a serverless computing component 1410. The serverless computing component 1410 may create an email using an email service 1412. In an example, the email service may be Amazon Simple Email Service® (SES). The email service 1412 may trigger an email notification to registered users. The system 110 may further include a data lake 1414. The data lake 1414 may be in communication with a serving zone 1416. The serving zone 1416 may be the serving zone 1018. The data lake 1414 may be the data lake 1020. The queuing service component 1408 may retrieve data from the serverless computing component 1410, and the serverless computing component 1406. The serverless computing component 1406 may transfer data from the data lake 1414 to the serving zone 1416. The serverless computing component 1406 may be in communication with a crawler 1418. The crawler 1418 may crawl datasets in the data lake 1414. The crawler 1418 may create consumption pattern schemas against files requested by the user. The user may invoke a visualization tool such as a Tableau® application 1420. The Tableau® application 1420 may be in communication with the crawler 1418. The Tableau® application 1420 may be in communication with a Java Database Connectivity® (JDBC) driver 1422. The crawler 1418 may retrieve files from the serving zone 1416 for visualization in the Tableau® application 1420. It must be appreciated by a person skilled in the art that the visualization consumption pattern 1014 may use any visualization tool without departing from the scope of the disclosure.

Figure 15:
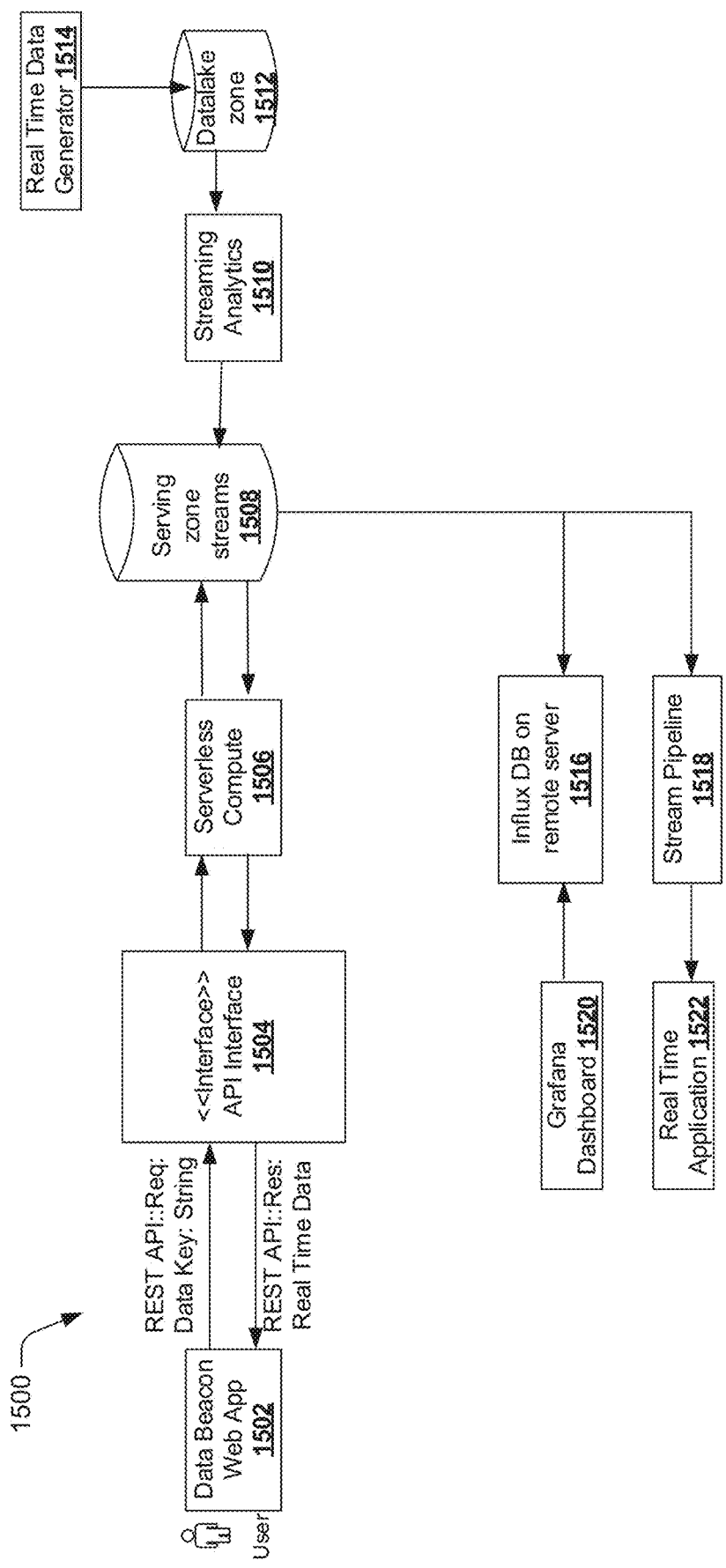
FIG. 15 illustrates a flow diagram for a real-time streaming consumption pattern, according to an example embodiment of the present disclosure.

FIG. 15 illustrates a flow diagram for a real-time streaming consumption pattern, according to an example embodiment of the present disclosure. All the components mentioned above may be referred to hereinafter. The data streaming consumption pattern 1034 may be used to consume data in real-time. The streaming data may be made available to a user in a real-time environment such as Grafana Dashboards®, Real-time monitoring application, and the like. In an example, as illustrated a user may interact with a data beacon application 1502 for data extraction. The data beacon application 1502 may interact with an API gateway 1504. A request object may be created based on the interaction of the data beacon application 1502 may interact with the API gateway 1504. The system 110 may further include a serverless computing component 1506. The serverless computing component 1506 may get data from a serving zone 1606. In an example, the serving zone 1606 may be the serving zone 1018. The serving zone 1606 may read data from an influx database 1516. The influx database 1516 may be on a remote server. In an example, the influx database 1516 may be in communication with a Grafana Dashboards® application 1520. The serving zone 1606 may read data from a stream pipeline 1518. The stream pipeline 1518 may be in communication with a Real-time monitoring application 1422. Further, the serving zone 1606 may read real-time data from a streaming analytics component 1608, a data lake 1512, and a real-time data generator 1514. In an example, the real-time data generator 1514 may be Kinesis Data Generator®. The streamed data may be fed to the influx database 1516 using a java application or the serverless computing component 1506. The Grafana Dashboards® application 1520 may load the data from the influx database 1516, and update the Grafana Dashboards® in real-time.

Figure 16:
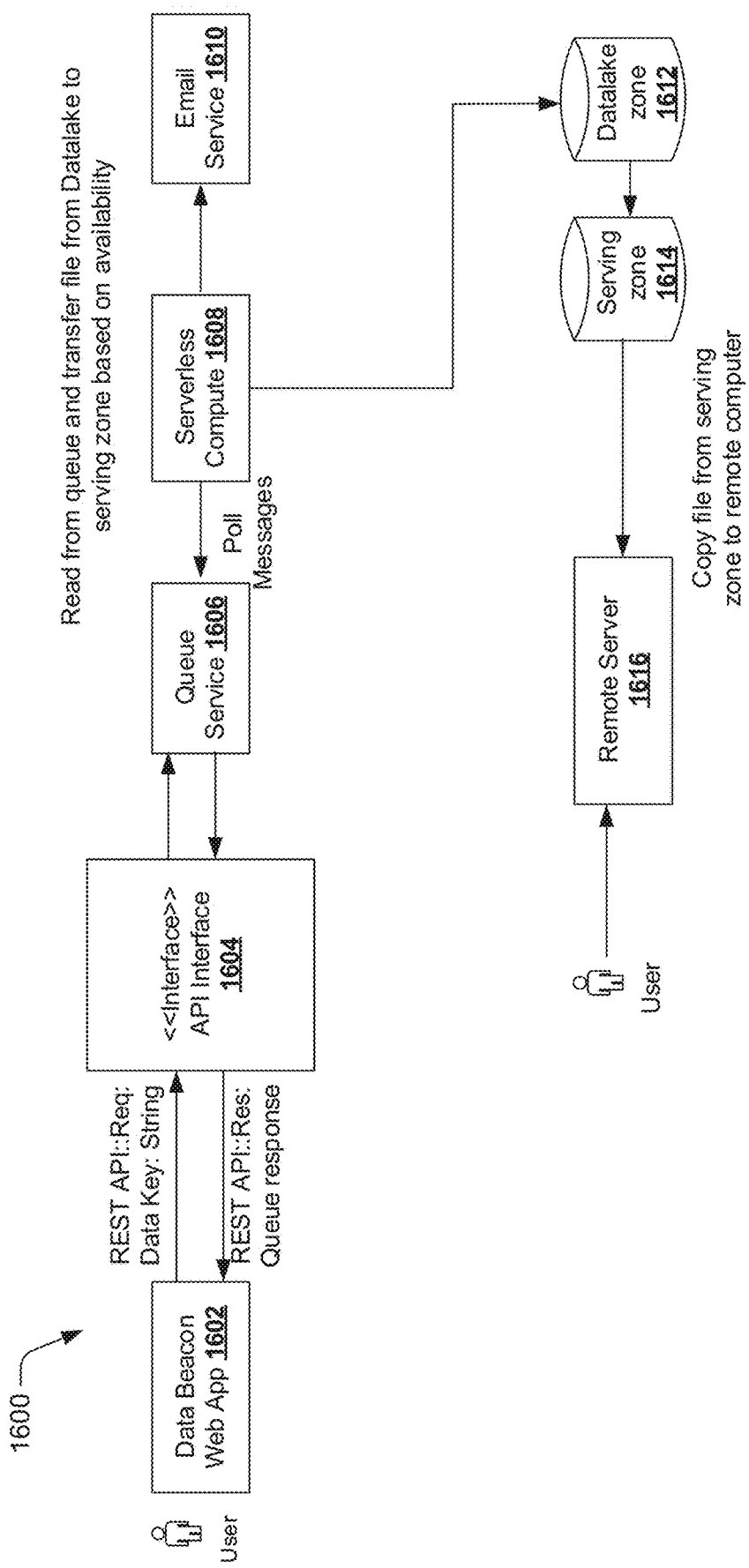
FIG. 16 illustrates a flow diagram for a sandbox streaming consumption pattern, according to an example embodiment of the present disclosure.

FIG. 16 illustrates a flow diagram for a sandbox streaming consumption pattern, according to an example embodiment of the present disclosure. All the components mentioned above may be referred to hereinafter. A user may interact with a data beacon application 1602 for data extraction. The data beacon application 1602 may interact with an API gateway 1604. A request object may be created based on the interaction of the data beacon application 1602 that may interact with the API gateway 1604. The system 110 may further include a queuing service component 1606. In an example, the queuing service component 1606 may use Amazon Simple Queue Service® (SQS). The system 110 may further include a serverless computing component 1608. The serverless computing component 1608 may get data from a serving zone 1614, and a data lake 1612. The serverless computing component 1608 may move the data from the data lake 1612 to the serving zone 1614 of the data requested by the user may not be present in the serving zone 1614. In an example, the serving zone 1614 may be the serving zone 1018, and the data lake 1612 may be the data lake 1020. The serving zone 1614 may copy the data on a remote server 1616. The user may consume data on the remote server 1616. The data may be consumed in formats such as CSV, JSON, Parquet, XML, and Avro. The user may need to configure for the sandbox consumption pattern 1016, in response to that an email notification may be triggered by the serverless computing component 1608 using an email service 1610 to the user. The user may access the data using clients such as WinScp®, Filezilla®, API Python®, and the like.

Table 2 presented herein describes various tools used by the system 110 for processing the data extracting requirement 202. The processing of the data extracting requirement 202 by the system 110 has been explained in detail with reference to AWS as an example. It will be appreciated that the functioning of the system 110 is not limited to AWS and any other cloud-based service may be also be used by the system 110.

TABLE 2

| Service Used | Description | Purpose | Specification |
| --- | --- | --- | --- |
| Amazon ® S3 | Amazon ® Simple Storage Service (Amazon ® S3) is an object storage service that offers industry-leading scalability, data availability, security, and performance. | S3 is the object-based scalable storage in the AWS ® cloud storing all the data | S3 Standard |
| AWS ® Glue | AWS ® Glue is a fully managed extract, transform, and load (ETL) service that makes it easy for customers to prepare, and load their data for analytics. | AWS ® Glue is an ETL service used for performing transformations on the data, and loading it into the different zones within S3 as per the need. | No specification |
| AWS ® Lambda | AWS ® Lambda is a compute service that lets you run code without provisioning or managing servers. AWS ® Lambda executes your code only when needed, and scales automatically, from a few requests per day to thousands per second. You pay only for the compute time you consume - there is no charge when your code is not running. | AWS ® Lambda is serverless computing service used to automate the movement of data across zones | No specification |

TABLE 2-continued

| Service Used | Description | Purpose | Specification |
| --- | --- | --- | --- |
| AWS ® Athena | Athena is a query service by AWS ® which can be used to query the data loaded in S3. It runs on the data catalog created either in Glue or in Lake Formation. | Athena is a query service by AWS ® which can be used to query the data loaded in S3. It runs on the data catalog created either in Glue or in Lake Formation | No specification |
| AWS ® SES | Amazon ® Simple Email Service (Amazon ® SES) is a cloud-based email sending service designed to help digital marketers, and application developers send marketing, notification, and transactional emails. It is a reliable, cost-effective service for businesses of all sizes that use email to keep in contact with their customers. | AWS ® SES is a managed email service for delivering messages, templatized emails | No specification |
| AWS ® SQS | Amazon ® Simple Queue Service (SQS) is a fully managed message queuing service that enables you to decouple, and scale microservices, distributed systems, and serverless applications. | AWS ® SQS is a queue for storing user requests for asynchronous events | No specification |
| AWS ® EC2 | Amazon ® Elastic Compute Cloud (Amazon ® EC2) is a web service that provides secure, resizable compute capacity in the cloud. It is designed to make web-scale cloud computing easier for developers. | EC2 is a server which will run data beacon application | No specification |
| AWS ® CloudFormation | AWS ® CloudFormation provides a common language for you to describe and provides all the infrastructure resources in your cloud environment. CloudFormation allows you to use a simple text file to model, and provision, in an automated, and secure manner, all the resources needed for your applications across all regions, and accounts. | CloudFormation is an infrastructure that provides a common language to automate the provisioning of resources by creating a template. | No specification |

TABLE 2-continued

| Service Used | Description | Purpose | Specification |
|---|---|---|---|
| IAWS ® Transfer | AWS ® Transfer is a managed SFTP server that maintains S3 as the directory to store data. | | No specification |
| AWS ® RDS (PostgreSQL) | Amazon ® Relational Database Service (Amazon ® RDS) is a web service that makes it easier to set up, operate, and scale a relational database in the cloud. | Amazon ® Relational Database Service (Amazon ® RDS) is a web service that makes it easier to set up, operate, and scale a relational database in the cloud. | No specification |
| AWS ® Kinesis Streams | Amazon ® Kinesis Data Streams (KDS) is a massively scalable, and durable real-time data streaming service. KDS can continuously capture gigabytes of data per second from hundreds of thousands of sources such as website clickstreams, database event streams, financial transactions, social media feeds, IT logs, and location-tracking events. | Amazon ® Kinesis Data Streams (KDS) is a massively scalable, and durable real-time data streaming service. KDS can continuously capture gigabytes of data per second from hundreds of thousands of sources such as website clickstreams, database event streams, financial transactions, social media feeds, IT logs, and location-tracking events. | No specification |
| AWS ® Kinesis Analytics | Amazon ® Kinesis Data Analytics is the easiest way to analyze streaming data, gain actionable insights, and respond to your business, and customer needs in real-time. | Amazon ® Kinesis Data Analytics is the easiest way to analyze streaming data, gain actionable insights, and respond to your business, and customer needs in real-time. | No specification |
| AWS ® API Gateway | Amazon ® API Gateway is an AWS ® service for creating, publishing, maintaining, monitoring, and securing REST, and WebSocket APIs at any scale. | Amazon ® API Gateway is an AWS ® service for creating, publishing, maintaining, monitoring, and securing REST, and WebSocket APIs at any scale. | No specification |

Figure 17:
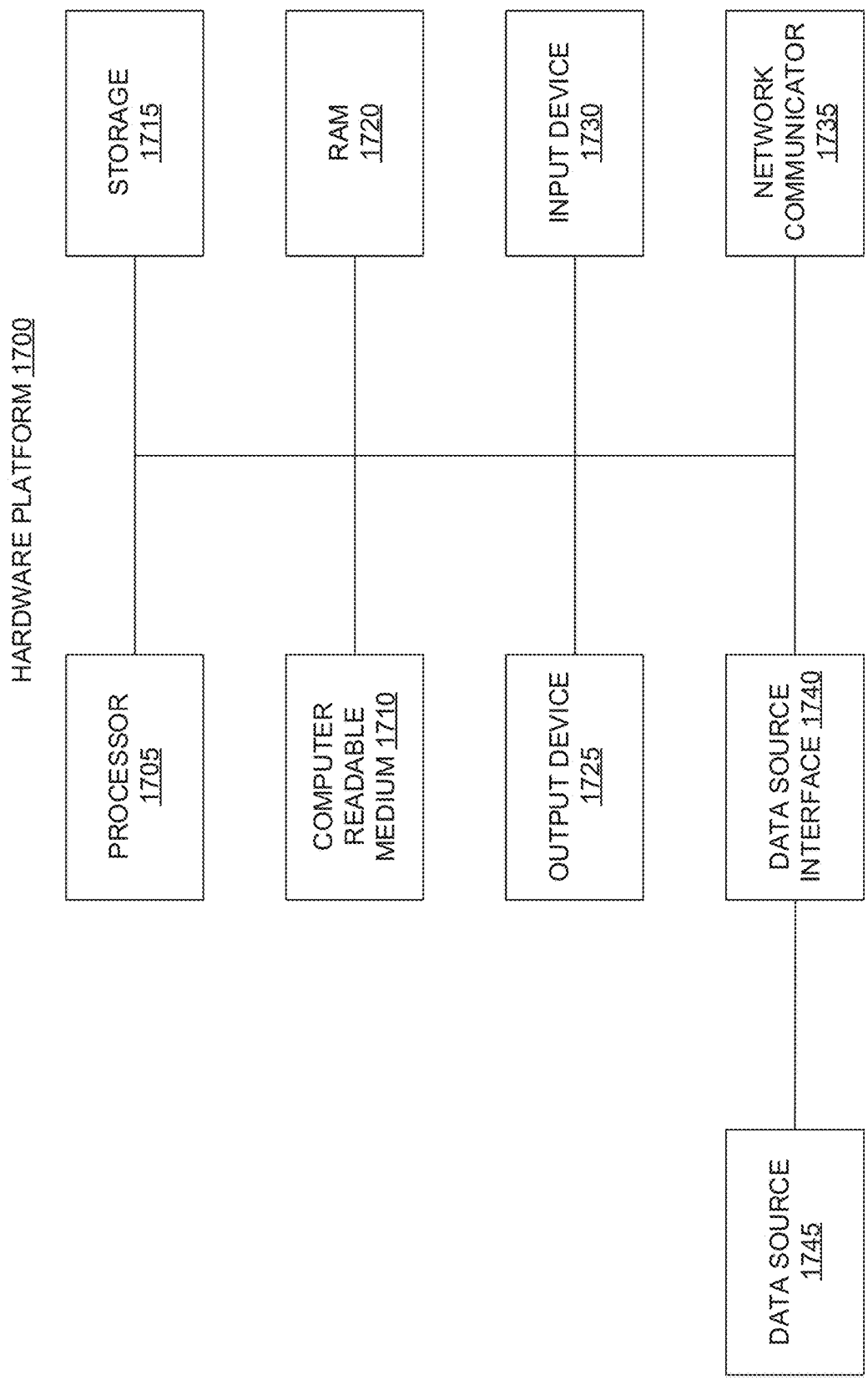
FIG. 17 illustrates a hardware platform for the implementation of the data integration and curation system, according to an example embodiment of the present disclosure.

FIG. 17 illustrates a hardware platform 1700 for implementation of the system 110, according to an example embodiment of the present disclosure. Particularly, computing machines such as but not limited to internal/external server clusters, quantum computers, desktops, laptops, smartphones, tablets, and wearables which may be used to execute the system 110 or may have the structure of the hardware platform 1700. The hardware platform 1700 may include additional components not shown, and that some of the components described may be removed, and/or modified. In another example, a computer system with multiple GPUs can sit on external-cloud platforms including Amazon Web Services, or internal corporate cloud computing clusters, or organizational computing resources, etc.

Over FIG. 17, the hardware platform 1700 may be a computer system 1700 that may be used with the examples described herein. The computer system 1700 may represent a computational platform that includes components that may be in a server or another computer system. The computer system 1700 may execute, by a processor (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 1700 may include a processor 1705 that executes software instructions or code stored on a non-transitory computer-readable storage medium 1710 to perform methods of the present disclosure. The software code includes, for example, instructions to gather data and documents, and analyze documents.

The instructions on the computer-readable storage medium 1710 are read and stored the instructions in storage 1715 or in random access memory (RAM) 17110. The storage 1715 provides a large space for keeping static data where at least some instructions could be stored for later execution. The stored instructions may be further compiled to generate other representations of the instructions, and dynamically stored in the RAM 1710. The processor 1705 reads instructions from the RAM 1710 and performs actions as instructed.

The computer system 1700 further includes an output device 1715 to provide at least some of the results of the execution as output including, but not limited to, visual information to users, such as external agents. The output device can include a display on computing devices and virtual reality glasses. For example, the display can be a mobile phone screen or a laptop screen. GUIs, and/or text are presented as an output on the display screen. The computer system 1700 further includes input device 1730 to provide a user or another device with mechanisms for entering data, and/or otherwise interact with the computer system 1700. The input device may include, for example, a keyboard, a keypad, a mouse, or a touchscreen.

A network communicator 1735 may be provided to connect the computer system 1700 to a network, and in turn to other devices connected to the network including other clients, servers, data stores, and interfaces, for instance. A network communicator 1735 may include, for example, a network adapter such as a LAN adapter or a wireless adapter. The computer system 1700 includes a data source interface 1740 to access data source 1745. A data source is an information resource. As an example, a database of exceptions, and rules may be a data source. Moreover, knowledge repositories and curated data may be other examples of data sources.

Figure 18B:
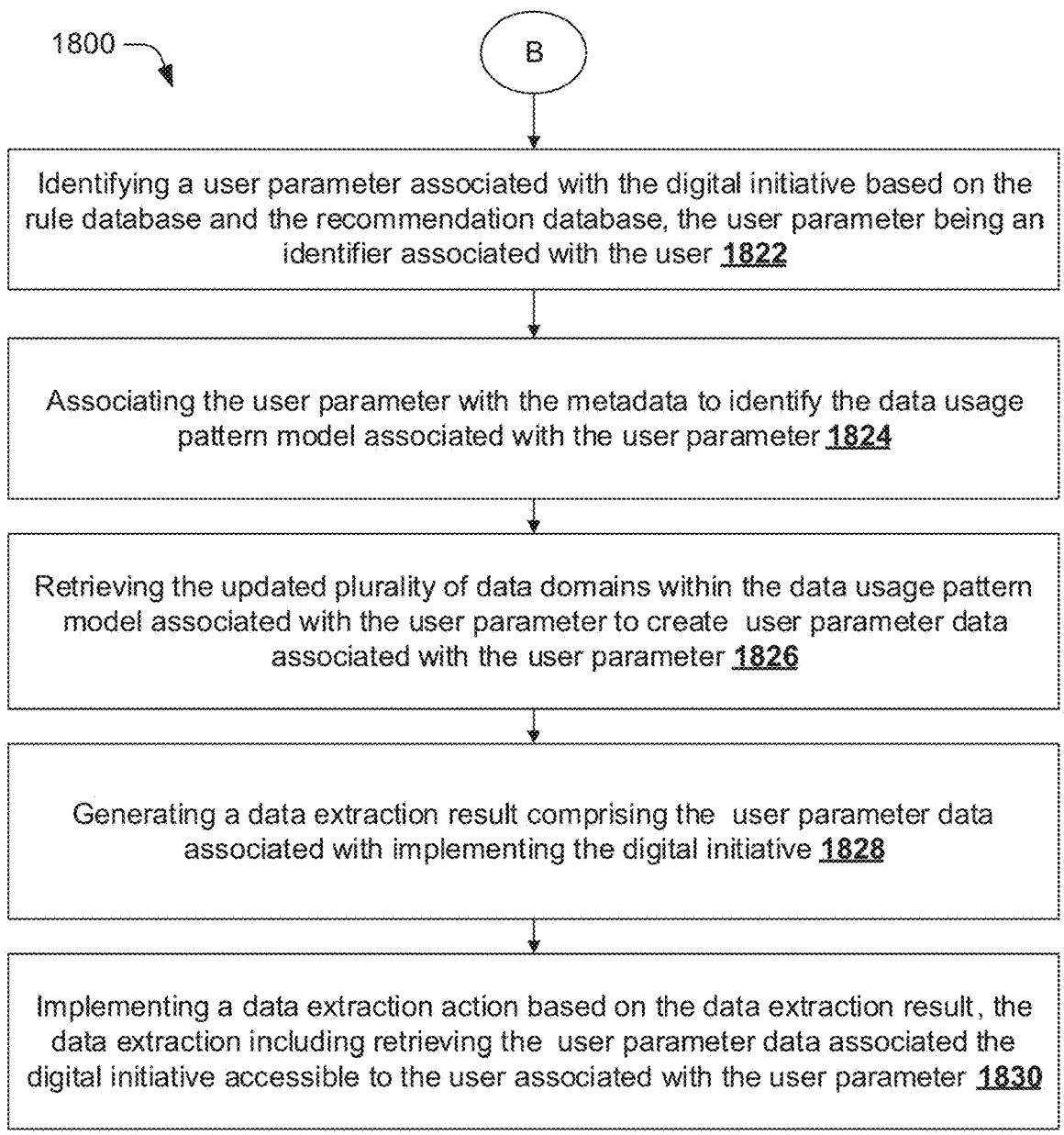
Figure 18C:
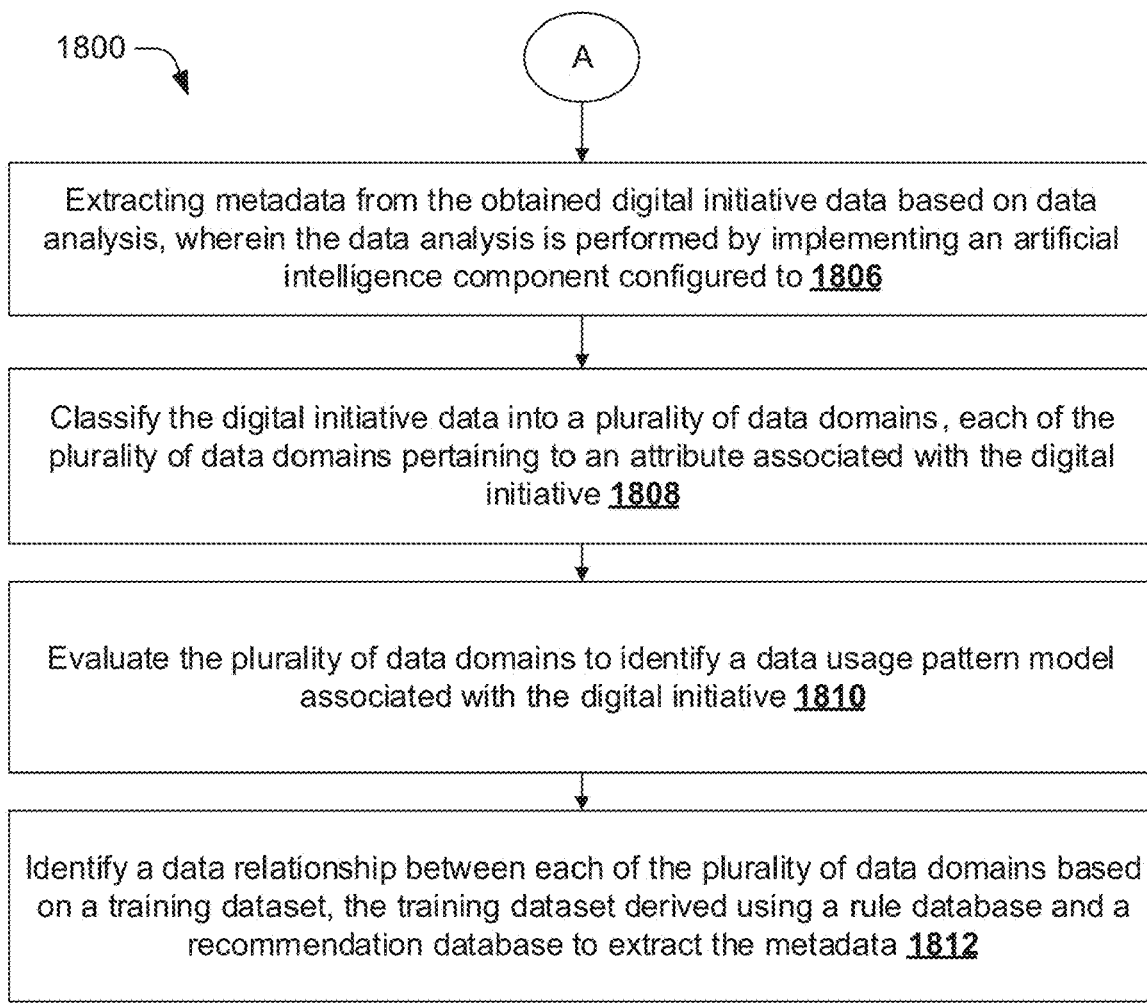

FIGS. 18A,18B, and 18C illustrate a method 1800 for the data integration and curation system 110 according to an example embodiment of the present disclosure.

It should be understood that method steps are shown here for reference only, and other combinations of the steps may be possible. Further, the method 1800 may contain some steps in addition to the steps shown in FIGS. 18A,18B, and 18C. The method 1800 may be performed by a component of the system 110, such as the processor 120, the data convener 130, the data curator 140, and the modeler 150.

At block 1802, a data extracting requirement 202 may be received from a user. The data extracting requirement 202 may be associated with the digital initiative.

At block 1804, digital initiative data 206 associated with the digital initiative may be obtained from the data source.

At block 1806, metadata 208 may be extracted from the obtained digital initiative data 206 based on data analysis. The data analysis is performed by implementing the artificial intelligence component 212.

At block 1808, the digital initiative data 206 may be classified into the plurality of data domains 210. Each of the plurality of data domains 210 may be pertaining to the attribute associated with the digital initiative.

At block 1810, the plurality of data domains 210 may be evaluated to identify the data usage pattern model 216 associated with the digital initiative.

At block 1812, the data relationship may be identified between each of the plurality of data domains 210 based on the training dataset, the training dataset derived using the rule database, and the recommendation database to extract the metadata 208.

At block 1814, the word index 222 may be determined from the knowledge database 226. The word index 222 may include the plurality of words 224 associated with the digital initiative data 206.

At block 1816, the plurality of words 224 may be mapped with the plurality of data domains 210 to identify the data anomaly 228 in the digital initiative data 206. In accordance with various embodiments of the present disclosure, the method 1800 may include mapping the plurality of words 224 with the user parameter data 236 to identify the data anomaly 228 in the digital initiative data 206.

At block 1818, the anomaly correction 230 may be determined to the digital initiative data 206 for resolving the data anomaly 228 based on the word index 222.

At block 1820, the plurality of data domains 210 may be updated to include the anomaly correction 230 for the data anomaly 228.

At block 1822, the user parameter 234 may be identified associated with the digital initiative based on the rule database, and the recommendation database. The user parameter 234 may be the identifier associated with the user.

At block 1824, the user parameter 234 may be associated with the metadata 208 to identify the data usage pattern model 216 associated with the user parameter 234.

At block 1826, the updated plurality of data domains 210 may be retrieved within the data usage pattern model 216 associated with the user parameter 234 to create user parameter data 236 associated with the user parameter 234.

At block 1828, the data extraction result 238 may be generated comprising the user parameter data 236 associated with implementing the digital initiative.

At block 1830, the data extraction action may be implemented based on the data extraction result 238, the data extraction including retrieving the user parameter data 236 associated with the digital initiative accessible to the user associated with the user parameter 234.

The method 1800 may further include performing the preprocessing operation on the digital initiative dataset associated with the digital initiative. The method 1800 may include identifying the preprocessed digital initiative dataset based on the preprocessing. The method 1800 may generate the classification model for the preprocessed digital initiative dataset by associating the preprocessed digital initiative dataset with the user parameter data 236. Further, a score may be determined for the preprocessed digital initiative dataset associated with the user parameter 234 based on the classification model. Additionally, the method 1800 may generate a recommendation for generating the data extraction result 238 accessible to the user for resolving the data extracting requirement 202 based on the score associated with the preprocessed digital initiative dataset.

The method 1800 further includes generating the visual representation of the extracted metadata 208 based on the data relationship between the plurality of data domains 210. The visual representation may include at least one of the data characteristics, data movements, and data transformations. Further, the method 1800 may include providing the data extraction result 238 based on the consumption pattern defined by the user. In an example, the consumption pattern defined by the user may include API consumption pattern, the downloadable consumption pattern, the visualization consumption pattern, the SFTP consumption pattern, and the data streaming consumption pattern. The present disclosure provides for the data integration and curation system 110 that may generate an integrated data access system across multiple data repositories while incurring minimal costs. The method 1800 may further include generating the anomaly correction marker 232 for the updated plurality of data domains 210, and the modeler 150 may retrieve the updated plurality of data domains 210 including the anomaly correction marker 232 to create the user parameter data 236.

In an example, the method 1800 may be practiced using a non-transitory computer-readable medium. In an example, the method 1800 may be computer-implemented.

One of ordinary skill in the art will appreciate that techniques consistent with the present disclosure are applicable in other contexts as well without departing from the scope of the disclosure.

What has been described, and illustrated herein are examples of the present disclosure. The terms, descriptions, and figures used herein are set forth by way of illustration only and are not meant as limitations. Many variations are possible within the spirit, and scope of the subject matter, which is intended to be defined by the following claims, and their equivalents in which all terms are meant in their broadest reasonable sense unless otherwise indicated.

We claim:

1. A system comprising:
   a processor;
   a data convener coupled to the processor, the data convener to:
   receive a data extracting requirement from a user, wherein the data extracting requirement is associated with a digital initiative;
   obtain digital initiative data associated with the digital initiative from a data source; and
   extract metadata from the obtained digital initiative data based on data analysis, wherein the data analysis is performed by implementing an artificial intelligence component to:
   classify the digital initiative data into a plurality of data domains, each of the plurality of data domains pertaining to an attribute associated with the digital initiative;
   evaluate the plurality of data domains to identify a data usage pattern model associated with the digital initiative; and
   identify a data relationship between each of the plurality of data domains based on a training dataset, the training dataset derived using a rule database and a recommendation database to extract the metadata;
   a data curator coupled to the processor, the data curator to:
   determine a word index from a knowledge database, the word index including a plurality of words being associated with the digital initiative data;
   map the plurality of words with the plurality of data domains to identify a data anomaly in the digital initiative data;
   determine an anomaly correction to the digital initiative data for resolving the data anomaly based on the word index; and
   update the plurality of data domains to include the anomaly correction for the data anomaly; and
   a modeler coupled to the processor, the modeler to:
   identify a user parameter associated with the digital initiative based on the rule database and the recommendation database, the user parameter being an identifier associated with the user;
   associate the user parameter with the metadata to identify the data usage pattern model associated with the user parameter;
   retrieve the updated plurality of data domains within the data usage pattern model associated with the user parameter to create user parameter data associated with the user parameter;
   generate a data extraction result comprising the user parameter data associated with implementing the digital initiative; and
   implement a data extraction action based on the data extraction result, the data extraction including retrieving the user parameter data associated the digital initiative accessible to the user associated with the user parameter.

2. The system as claimed in claim 1, wherein the modeler is to:
   perform a preprocessing operation on the digital initiative dataset associated with the digital initiative;
   identify a preprocessed digital initiative dataset based on the preprocessing;
   generate a classification model for the preprocessed digital initiative dataset by associating the preprocessed digital initiative dataset with the user parameter data;
   determine a score for the preprocessed digital initiative dataset associated with the user parameter based on the classification model; and
   generate a recommendation for generating the data extraction result accessible to the user for resolving the data extracting requirement based on the score associated with the preprocessed digital initiative dataset.

3. The system as claimed in claim 1, wherein the data curator is to map the plurality of words with the user parameter data to identify the data anomaly in the digital initiative data.

4. The system as claimed in claim 1, wherein the data convener is to generate a visual representation of the extracted metadata based on the data relationship between the plurality of data domains, the visual representation comprising at least one of data characteristics, data movements, and data transformations.

5. The system as claimed in claim 1, wherein the system further comprises a data delivery component to provide the data extraction result based on a consumption pattern defined by the user.

6. The system as claimed in claim 5, wherein the consumption pattern defined by the user comprises at least one of an Application Program Interface (API) consumption pattern, a downloadable consumption pattern, a visualization consumption pattern, a Secure Shell File Transfer Protocol (SFTP) consumption pattern, and a data streaming consumption pattern.

7. The system as claimed in claim 1, wherein the data curator is to generate an anomaly correction marker for the updated plurality of data domains, and the modeler is to retrieve the updated plurality of data domains including the anomaly correction marker to create the user parameter data.

8. A method comprising:
   receiving, by a processor, a data extracting requirement from a user, wherein the data extracting requirement is associated with a digital initiative;
   obtaining, by the processor, digital initiative data associated with the digital initiative from a data source; and
   extracting, by the processor, metadata from the obtained digital initiative data based on data analysis, wherein the data analysis is performed by implementing an artificial intelligence component to:

classify the digital initiative data into a plurality of data domains, each of the plurality of data domains pertaining to an attribute associated with the digital initiative;

evaluate the plurality of data domains to identify a data usage pattern model associated with the digital initiative; and identify a data relationship between each of the plurality of data domains based on a training dataset, the training dataset derived using a rule database and a recommendation database to extract the metadata;

determining, by the processor, a word index from a knowledge database, the word index including a plurality of words being associated with the digital initiative data;

mapping, by the processor, the plurality of words with the plurality of data domains to identify a data anomaly in the digital initiative data;

determining, by the processor, an anomaly correction to the digital initiative data for resolving the data anomaly based on the word index;

updating, by the processor, the plurality of data domains to include the anomaly correction for the data anomaly;

identifying, by the processor, a user parameter associated with the digital initiative based on the rule database and the recommendation database, the user parameter being an identifier associated with the user;

associating, by the processor, the user parameter with the metadata to identify the data usage pattern model associated with the user parameter;

retrieving, by the processor, the updated plurality of data domains within the data usage pattern model associated with the user parameter to create user parameter data associated with the user parameter;

generating, by the processor, a data extraction result comprising the user parameter data associated with implementing the digital initiative; and implementing, by the processor, a data extraction action based on the data extraction result, the data extraction including retrieving the user parameter data associated the digital initiative accessible to the user associated with the user parameter.

9. The method as claimed in claim 8, wherein the method further comprises:

performing, by the processor, a preprocessing operation on the digital initiative dataset associated with the digital initiative;

identifying, by the processor, a preprocessed digital initiative dataset based on the preprocessing;

generating, by the processor, a classification model for the preprocessed digital initiative dataset by associating the preprocessed digital initiative dataset with the user parameter data;

determining, by the processor, a score for the preprocessed digital initiative dataset associated with the user parameter based on the classification model; and generating, by the processor, a recommendation for generating the data extraction result accessible to the user for resolving the data extracting requirement based on the score associated with the preprocessed digital initiative dataset.

10. The method as claimed in claim 8, wherein the method further comprises mapping, by the processor, the plurality of words with the user parameter data to identify the data anomaly in the digital initiative data.

11. The method as claimed in claim 8, wherein the method further comprises generating, by the processor, a visual representation of the extracted metadata based on the data relationship between the plurality of data domains, the visual representation comprising at least one of data characteristics, data movements, and data transformations.

12. The method as claimed in claim 8, wherein the method further comprises providing, by the processor, the data extraction result based on a consumption pattern defined by the user.

13. The method as claimed in claim 12, wherein the consumption pattern defined by the user comprises at least one of an Application Program Interface (API) consumption pattern, a downloadable consumption pattern, a visualization consumption pattern, a Secure Shell File Transfer Protocol (SFTP) consumption pattern, and a data streaming consumption pattern.

14. The method as claimed in claim 8, wherein the method further comprises generating, by the processor, an anomaly correction marker for the updated plurality of data domains, and retrieving the updated plurality of data domains including the anomaly correction marker to create the user parameter data.

15. A non-transitory computer readable medium including machine readable instructions that are executable by a processor to:

receive a data extracting requirement from a user, wherein the data extracting requirement is associated with a digital initiative;

obtain digital initiative data associated with the digital initiative from a data source;

extract metadata from the obtained digital initiative data based on data analysis, wherein the data analysis is performed by implementing an artificial intelligence component to:

classify the digital initiative data into a plurality of data domains, each of the plurality of data domains pertaining to an attribute associated with the digital initiative;

evaluate the plurality of data domains to identify a data usage pattern model associated with the digital initiative; and identify a data relationship between each of the plurality of data domains based on a training dataset, the training dataset derived using a rule database and a recommendation database to extract the metadata;

determine a word index from a knowledge database, the word index including a plurality of words being associated with the digital initiative data;

map the plurality of words with the plurality of data domains to identify a data anomaly in the digital initiative data;

determine an anomaly correction to the digital initiative data for resolving the data anomaly based on the word index;

update the plurality of data domains to include the anomaly correction for the data anomaly identify a user parameter associated with the digital initiative based on the rule database and the recommendation database, the user parameter being an identifier associated with the user;

associate the user parameter with the metadata to identify the data usage pattern model associated with the user parameter;

retrieve the updated plurality of data domains within the data usage pattern model associated with the user parameter to create user parameter data associated with the user parameter;

generate a data extraction result comprising the user parameter data associated with implementing the digital initiative; and implement a data extraction action based on the data extraction result, the data extraction including retrieving the user parameter data associated the digital initiative accessible to the user associated with the user parameter.

16. The non-transitory computer-readable medium of claim 15, wherein the processor is to:

perform a preprocessing operation on the digital initiative dataset associated with the digital initiative;

identify a preprocessed digital initiative dataset based on the preprocessing;

generate a classification model for the preprocessed digital initiative dataset by associating the preprocessed digital initiative dataset with the user parameter data;

determine a score for the preprocessed digital initiative dataset associated with the user parameter based on the classification model; and generate a recommendation for generating the data extraction result accessible to the user for resolving the data extracting requirement based on the score associated with the preprocessed digital initiative dataset.

17. The non-transitory computer-readable medium of claim 16, wherein the processor is to generate a visual representation of the extracted metadata based on the data relationship between the plurality of data domains, the visual representation comprising at least one of data characteristics, data movements, and data transformations.

18. The non-transitory computer-readable medium of claim 16, wherein the processor is to provide the data extraction result based on a consumption pattern defined by the user.

19. The non-transitory computer-readable medium of claim 15, wherein the processor is to map the plurality of words with the user parameter data to identify the data anomaly in the digital initiative data.

20. The non-transitory computer-readable medium of claim 15, wherein the processor is to generate an anomaly correction marker for the updated plurality of data domains, and retrieve the updated plurality of data domains including the anomaly correction marker to create the user parameter data.

* * * * *